United States Patent
Onoda et al.

(10) Patent No.: US 8,228,781 B2
(45) Date of Patent: Jul. 24, 2012

(54) RECORDING MEDIUM, DATA RECORDING APPARATUS, DATA REPRODUCING APPARATUS AND DATA RECORDING METHOD

(75) Inventors: Senichi Onoda, Osaka (JP); Toshihisa Nakano, Osaka (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 12/282,200

(22) PCT Filed: Jul. 30, 2007

(86) PCT No.: PCT/JP2007/064898
§ 371 (c)(1),
(2), (4) Date: Sep. 17, 2008

(87) PCT Pub. No.: WO2008/016008
PCT Pub. Date: Feb. 7, 2008

(65) Prior Publication Data
US 2009/0245053 A1  Oct. 1, 2009

(30) Foreign Application Priority Data
Aug. 3, 2006 (JP) .................................. 2006-211847

(51) Int. Cl.
*G11B 7/00* (2006.01)
(52) U.S. Cl. .................................... 369/275.4; 369/53.2
(58) Field of Classification Search .................. 369/53.2, 369/275.4, 277, 53.21, 275.1, 275.3, 278
See application file for complete search history.

(56) References Cited

U.S. PATENT DOCUMENTS

| | | | |
|---|---|---|---|
| 6,707,774 B1* | 3/2004 | Kuroda et al. | 369/53.21 |
| 7,149,175 B2* | 12/2006 | Sako et al. | 369/275.3 |
| 7,154,831 B2* | 12/2006 | Yanagawa et al. | 369/53.19 |
| 2002/0044509 A1* | 4/2002 | Nakajima | 369/53.22 |
| 2002/0071364 A1* | 6/2002 | Yanagawa et al. | 369/53.19 |
| 2005/0036416 A1* | 2/2005 | Fukui | 369/53.2 |
| 2005/0094520 A1* | 5/2005 | Lo Muzio et al. | 369/53.2 |
| 2007/0140071 A1* | 6/2007 | Yamamoto et al. | 369/13.24 |
| 2009/0113555 A1 | 4/2009 | Hamersley et al. | |
| 2009/0245053 A1 | 10/2009 | Onoda et al. | |

FOREIGN PATENT DOCUMENTS

| | | |
|---|---|---|
| JP | 2002-358654 | 12/2002 |
| JP | 2004-246990 | 9/2004 |
| JP | 2007-141277 | 6/2007 |

(Continued)

OTHER PUBLICATIONS

International Search Report issued Aug. 21, 2007 in the International (PCT) Application of which the present application is the U.S. National Stage.

*Primary Examiner* — Thomas Alunkal
(74) *Attorney, Agent, or Firm* — Wenderoth Lind & Ponack, L.L.P.

(57) ABSTRACT

A new-type recordable DVD medium has medium characteristics not defined in the DVD-R standards and has compatibility with the DVD-ROM standards. Since information on the new-type recordable DVD medium can be played back by an existing player, even when content data protected by CSS (Content Scrambling System) is recorded on the new-type recordable DVD medium, the recordable DVD medium can be used for content distribution service using a kiosk terminal.

12 Claims, 14 Drawing Sheets

FOREIGN PATENT DOCUMENTS

| | | |
|---|---|---|
| JP | 4156019 | 7/2008 |
| JP | 2009-512113 | 3/2009 |
| WO | 2007/010987 | 1/2007 |
| WO | 2007/046494 | 4/2007 |
| WO | 2007/114044 | 10/2007 |
| WO | 2007/138686 | 12/2007 |

* cited by examiner

FIG. 5
(a)
(b)
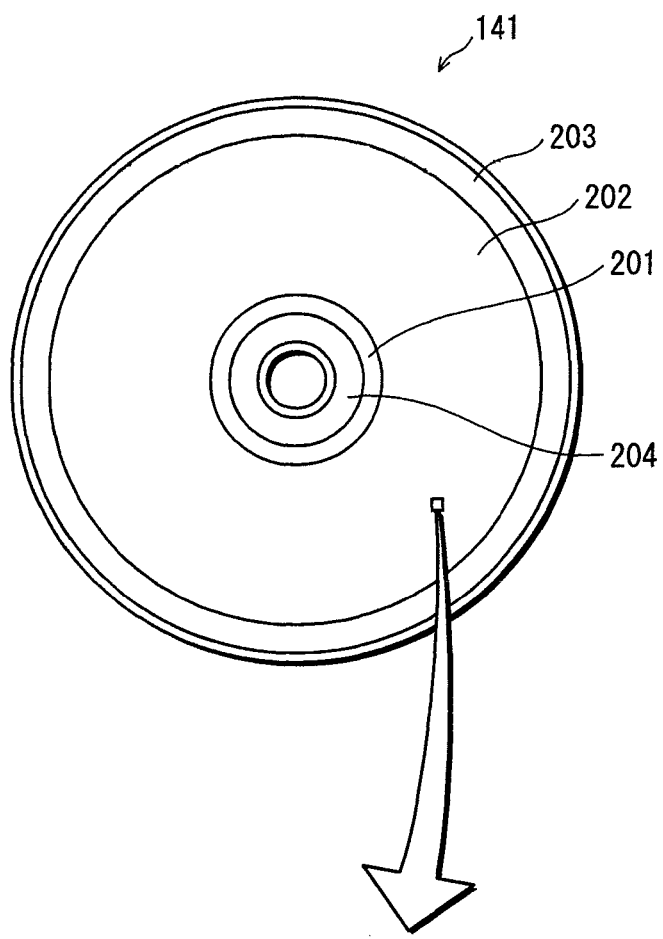
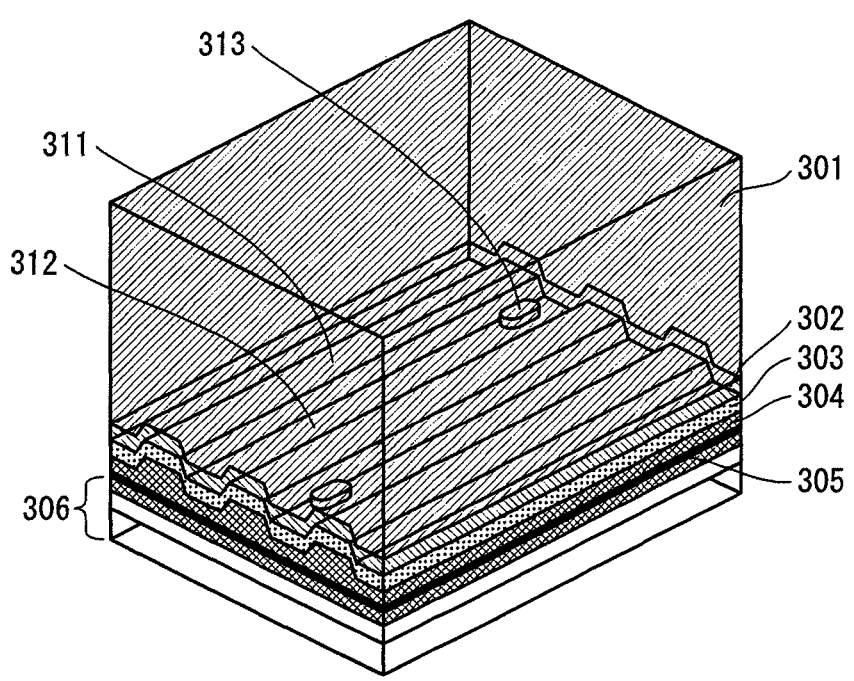

DVD-R wobble frequency = 140.645kHz

Wobble frequency of new-type recordable blank disc = 280kHz

RECORDING MEDIUM, DATA RECORDING APPARATUS, DATA REPRODUCING APPARATUS AND DATA RECORDING METHOD

BACKGROUND OF THE INVENTION

1. Technical Field

The present invention relates to a recording medium for recording digital data therein, and specifically to a recordable-type recording medium.

2. Background Art

One of typical methods for distributing digital contents of movies or the like is to distribute DVD-ROM discs with the digital contents recorded thereon, where DVD stands for Digital Versatile Disc.

In such a content distribution using DVD-ROM discs, content data conforming to the DVD-Video standard and protected by CSS (Content Scrambling System) are recorded onto the DVD-ROM discs. The CSS is a system that has been introduced to prevent unauthorized copy of contents. Currently, popular DVD players on the market are incorporated with a mechanism for achieving conformation to the CSS rules.

Currently under consideration as a content distribution method other than the above-described one using DVD-ROM is a system in which contents are downloaded using kiosk terminals installed in shops such as convenience stores.

The kiosk terminals are connected via a network with a server which stores contents therein. On a kiosk terminal, a user selects a content to purchase and inserts a recordable blank disc into the kiosk terminal. The kiosk terminal obtains the selected content from the server, and records the obtained content onto the blank disc. The content is subjected to some measures for copyright protection before it is recorded onto the disc.

In the above-described system, DVD-R, which is currently a mainstream recordable-type recording medium, may be used as the blank disc.

Patent Document 1: Japanese Patent Application Publication No. 2004-246990

In the above-described system, when DVD-R is used as the blank disc and the CSS is adopted as the copyright protection technology, expected is a problem that the content recorded on a DVD-R disc cannot be played back by conventional DVD players.

This is because the conventional DVD players are incorporated with a mechanism for achieving conformation to the CSS rules, and the mechanism regards a content recorded on a DVD-R disc, which has been inserted into such a conventional DVD player, as an unauthorized copy and prevents the DVD player from playing back the content when the content is protected by the CSS.

However, when the mechanism was created, CSS-protected contents were generally expected to be distributed on the discs. Therefore, with the above-described system in which a kiosk terminal receives a content and writes the received content onto a blank disc, the following inconveniences are expected to occur.

The kiosk terminal is licensed to write a CSS-protected content onto a DVD-R disc. On the other hand, a user, who had purchased a CSS-protected content and made the kiosk terminal write the content onto a DVD-R disc, would find that the content cannot be played back by a conventional DVD player that the user has. It would, however, be difficult to request all the users who wish to use the service via the kiosk terminal, to purchase a new DVD player that can play back the CSS-protected content recorded on the DVD-R disc.

Such an inconvenience might prevent the spread of the new content distribution system.

An object of the present invention is therefore to provide a recordable-type recording medium that enables a conventional DVD player to play back a content protected by the CSS that is recorded on the recordable-type recording medium itself, and to provide a data recording device, a data playback device, and a data recording method for the recordable-type recording medium.

SUMMARY OF THE INVENTION

Provided by the present invention to solve the above-described problems is a recordable-type recording medium that has a medium characteristic which is not defined in a DVD-R standard, and has compatibility with a DVD-ROM standard.

With the above-described structure of the present invention as a recording medium, when the recording medium is loaded into an existing DVD player that judges from its medium characteristic whether or not the recording medium is a DVD-R disc, the recording medium can identify itself as a recording medium different from a DVD-R disc.

This enables the user to watch/listen to a CSS-protected content recorded on the recording medium of the present invention, by using an existing DVD player.

It is expected that the recording medium of the present invention is used in a service of selling, with authenticate license, contents to users with use of a kiosk terminal.

In that case, the kiosk terminal may judge whether the recording medium loaded therein by the user is an existing DVD-R disc or the new-type recording medium of the present invention. Further, the kiosk terminal may write a CSS-protected content onto the recording medium loaded therein by the user only when the terminal judges that the loaded recording medium is the new-type recording medium of the present invention. This makes it possible to supply the user with a recorded disc that can be played back by an existing DVD player.

In the above-described recordable-type recording medium, the medium characteristic may be a physical characteristic which is not defined in the DVD-R standard.

With the above-described structure, the recording medium of the present invention can be distinguished from an existing DVD-R disc. This enables a CSS-protected content to be recorded onto the recording medium of the present invention so that the content can be played back by an existing DVD player in spite of the fact that the medium is a recordable-type DVD medium.

In the above-described recordable-type recording medium, the physical characteristic not defined in the DVD-R standard may be a recording layer in which formed are lands, pits, and grooves having a groove wobble whose amplitude is "0".

Conventional DVD-R discs have a groove wobble having a predetermined amount of amplitude. In contrast, the groove wobble in the recording medium of the present invention has 0 amplitude, apparently different from the conventional DVD-R discs.

Accordingly, it is possible to distinguish between a conventional DVD-R disc and the recording medium of the present invention by checking the shape of the grooves when data is recorded onto the recording medium and data on the recording medium is played back.

In the above-described recordable-type recording medium, the physical characteristic not defined in the DVD-R standard may be a recording layer in which formed are lands, pits, and grooves whose groove wobble has been made with a frequency that is different from a groove wobble frequency defined in the DVD-R standard.

In the above-described recordable-type recording medium, the physical characteristic not defined in the DVD-R standard may be a recording layer in which formed are lands, pits, and grooves whose groove wobble has been made with a frequency of a value that is resulted from an integral multiplication or a fractional multiplication of the groove wobble frequency defined in the DVD-R standard.

With the above-described structure, the recording medium of the present invention differs from conventional DVD-R discs in the wobble frequency, and thus it is possible to distinguish between a conventional DVD-R disc and the recording medium of the present invention by checking the wobble frequency when data is recorded onto the recording medium and data on the recording medium is played back.

In the above-described recordable-type recording medium, the physical characteristic not defined in the DVD-R standard may be a flat recording layer on which formed are address pits that are used for determining recording positions.

With the above-described structure, the recording medium of the present invention has no land or groove while conventional DVD-R discs have, as a track format, lands and grooves. Accordingly, the recording medium of the present invention has a physical characteristic that is different from that of the conventional DVD-R discs.

Accordingly, it is possible to distinguish between a conventional DVD-R disc and the recording medium of the present invention by checking the track format when data is recorded onto the recording medium and data on the recording medium is played back.

Also, since the recording medium of the present invention has address pits formed thereon, it is possible to record data onto the recording medium of the present invention by using the address pits to determine the position at which the data is to be recorded.

The above-described recordable-type recording medium may further comprise: an information area composed of a lead-in area, a data area, and a lead-out area; and an R-information area that is provided at a location more inner than the information area towards a center of the medium, wherein the physical characteristic not defined in the DVD-R standard is that no recording layer has been formed in the R-information area and a recording layer has been formed in the information area.

In conventional DVD-R discs, the recording layer is formed in the Information area and the R-Information area that is located more inner than the Information area towards the center of the discs.

In contrast, in the recording medium of the present invention, the recording layer is formed in the Information area only. This structure is clearly different from that of conventional DVD-R discs.

Accordingly, it is possible to distinguish between a conventional DVD-R disc and the recording medium of the present invention by checking whether or not there is a recording area in an area that is located more inner than the Information area toward the center of the medium, when data is recorded onto the recording medium and data on the recording medium is played back.

In the above-described recordable-type recording medium, the medium characteristic may be a logical characteristic which is not defined in the DVD-R standard.

With the above-described structure, the recording medium of the present invention can be distinguished from an existing DVD-R disc. This enables a CSS-protected content to be recorded onto the recording medium of the present invention so that the content can be played back by an existing DVD player in spite of the fact that the medium is a recordable-type DVD medium.

In the above-described recordable-type recording medium, the logical characteristic not defined in the DVD-R standard may be that an area, within a lead-in area, storing R/RW physical format information is embedded with a value that is different from a value which indicates DVD-R.

In the above-described recordable-type recording medium, the logical characteristic not defined in the DVD-R standard may be that an area, within a lead-in area, storing R/RW physical format information is entirely embedded with a same value.

In conventional DVD-R discs, a value indicating that the own disc is a recordable-type DVD-R disc is embedded in the area in which the R/RW physical format information is recorded. The recording medium of the present invention is totally different from the conventional DVD-R discs in the contents of the area in which the R/RW physical format information is recorded.

Accordingly, it is possible to distinguish between a conventional DVD-R disc and the recording medium of the present invention by extracting data from the area in which the R/RW physical format information is recorded, when data is recorded onto the recording medium and data on the recording medium is played back.

In the above-described recordable-type recording medium, a value indicating that the recording medium is a ROM disc may be contained in physical format information recorded in a lead-in area.

The conventional DVD-R discs, as a matter of course, do not have physical format information that indicates that the own disc is a ROM disc. As apparent from this, the recording medium of the present invention is totally different from the conventional DVD-R discs in the logical characteristics, in spite of the fact that the recording medium is a recordable-type.

Accordingly, it is possible to distinguish between a conventional DVD-R disc and the recording medium of the present invention by extracting data from the area in which the physical format information is recorded, when data is recorded onto the recording medium and data on the recording medium is played back.

Also provided by the present invention to solve the above-described problems is a data recording device comprising: an obtaining unit operable to obtain a characteristic of a recording medium that is an entity independent of the device; a judging unit operable to judge whether or not the recording medium is the recordable-type recording medium defined in claim 1; and a writing unit operable to write data onto the recording medium when the judging unit judges positively.

With the above-described structure, the data recording device of the present invention does not write data onto a recording medium loaded thereinto when it identifies the loaded recording medium as a recording medium, such as a conventional DVD-R disc, that is different from the recordable-type recording medium defined in claim 1. The data recording device of the present invention thus generates only recorded discs that can be played back by conventional DVD players, and do not generate recorded discs that cannot be played back by conventional DVD players.

It is expected that the recording medium and the data recording device of the present invention are used in a service of selling, with authenticate license, contents to users with use of a kiosk terminal (which corresponds to the data recording device).

In that case, the kiosk terminal may judge whether the recording medium loaded therein by the user is an existing DVD-R disc or the new-type recording medium of the present invention. Further, the kiosk terminal may write a CSS-protected content onto the recording medium loaded therein by the user only when the terminal judges that the loaded recording medium is the new-type recording medium of the present invention. This enables the user to watch/listen to the content by playing back the content using an existing DVD player.

In the above-described data recording device, the writing unit may judge whether the data is protected by CSS (Content Scrambling System) and the data conforms to a DVD-Video standard, and writes the data onto the recording medium when the writing unit judges that the data is protected by CSS and conforms to the DVD-Video standard and the judging unit judges positively.

With the above-described structure, the data recording device, with an authenticate license, can provide a service of supplying users with copyright-protected data.

In the above-described data recording device, the writing unit may write content provider information into a lead-in area of the recording medium when the judging unit judges positively.

Conventional DVD-R discs do not have the content provider information in the lead-in area, while conventional DVD-ROM discs have the content provider information in the lead-in area.

Accordingly, when the content provider information is written onto the recordable-type recording medium defined in claim 1 by the data recording device of the present invention, the recording medium is treated as a ROM disc by a conventional DVD player when data is played back, and the data can be played back.

In the above-described data recording device, the obtaining unit may obtain a physical characteristic from the recording medium, and the judging unit may judge whether or not the recording medium is the recordable-type recording medium defined in claim 1 based on the obtained physical characteristic.

With the above-described structure, the data recording device can distinguish between a conventional DVD-R disc and the recording medium of the present invention by performing a simple and easy process of obtaining a physical characteristic.

In the above-described data recording device, the obtaining unit may obtain an amplitude of groove wobble as the physical characteristic, and the judging unit may judge that the recording medium is the recordable-type recording medium defined in claim 1 when the obtained amplitude is "0".

With the above-described structure, the data recording device can distinguish between a conventional DVD-R disc and the recordable-type recording medium of the present invention by performing a simple and easy process of judging whether or not there is wobbling.

In the above-described data recording device, the obtaining unit may obtain a frequency of groove wobble as the physical characteristic, and the judging unit may judge that the recording medium is the recordable-type recording medium defined in claim 1 when the obtained frequency is different from a groove wobble frequency defined in a DVD-R standard.

In the above-described data recording device, the judging unit may judge that the recording medium is the recordable-type recording medium defined in claim 1 when the obtained frequency is a value that is resulted from an integral multiplication or a fractional multiplication of the groove wobble frequency defined in the DVD-R standard.

With the above-described structure, the data recording device can distinguish between a conventional DVD-R disc and the recordable-type recording medium of the present invention by performing a simple and easy process of checking the wobble frequency.

In the above-described data recording device, the obtaining unit may obtain, as the physical characteristic, information indicating a track format of the recording medium, and the judging unit may judge that the recording medium is the recordable-type recording medium defined in claim 1 when the judging unit judges that neither groove nor land exists in the recording medium, based on the obtained information.

With the above-described structure, the data recording device can distinguish between a conventional DVD-R disc and the recordable-type recording medium of the present invention by performing a simple and easy process of checking the track format of the recording medium.

In the above-described data recording device, the obtaining unit may obtain the physical characteristic from an area located more inner than a lead-in area towards a center of the recording medium, and the judging unit may judge that the recording medium is the recordable-type recording medium defined in claim 1 when no recording layer exists in the area located more inner than the lead-in area.

With the above-described structure, the data recording device can distinguish between a conventional DVD-R disc and the recordable-type recording medium of the present invention by checking whether or not a recording area called R-Information area, which is provided in conventional DVD-R discs, is provided in the recording medium loaded therein.

In the above-described data recording device, the obtaining unit may obtain a logical characteristic from the recording medium, and the judging unit may judge whether or not the recording medium is the recordable-type recording medium defined in claim 1 based on the obtained logical characteristic.

With the above-described structure, the data recording device can distinguish between a conventional DVD-R disc and the recordable-type recording medium of the present invention by performing a simpler and easier process than the process of obtaining a physical characteristic.

In the above-described data recording device, the obtaining unit may obtain format information from an area in which R/RW physical format information is recorded, and the judging unit may judge that the recording medium is the recordable-type recording medium defined in claim 1 when the obtained format information is a value that is different from a value which indicates DVD-R.

In the above-described data recording device, the judging unit may judge that the recording medium is the recordable-type recording medium defined in claim 1 when the obtained format information is composed of values that are all same with each other.

In the above-described data recording device, the obtaining unit may obtain physical format information from the recording medium, and the judging unit may judge that the recording medium is the recordable-type recording medium defined in claim 1 when a value indicating that the recording medium is a ROM disc is recorded in the obtained physical format information.

With the above-described structure, the data recording device can distinguish between a conventional DVD-R disc and the recordable-type recording medium of the present invention by performing a simple and easy process of checking the physical format information.

The above-described data recording device may further comprise: a medium holding unit operable to hold a recording medium that is an entity independent of the device and has been inserted into the device from outside; and a control unit operable to control the medium holding unit so as to eject the recording medium to outside the device when the judging unit judges that the recording medium is not the recordable-type recording medium defined in claim 1.

With the above-described structure, the data recording device can immediately eject a disc without recording data thereonto when it judges that the disc inserted by the user is a disc different from the recordable-type recording medium of the present invention. This makes it possible to notify the user that the inserted disc is a disc onto which data cannot be recorded.

In the above-described data recording device, the writing unit may write the data onto the recording medium using the medium characteristic of the recordable-type recording medium defined in claim 1.

In the above-described data recording device, the writing unit may write the data onto the recording medium using, as the medium characteristic, a groove wobble frequency of the recordable-type recording medium defined in claim 1 that is different from a groove wobble frequency defined in the DVD-R standard.

In the above-described data recording device, the groove wobble frequency of the recordable-type recording medium defined in claim 1 may have been set to a value that is resulted from an integral multiplication of the groove wobble frequency defined in the DVD-R standard.

With the above-described structure, the data recording device can write data onto the new-type recordable disc using the medium characteristic (for example, track format) that is judged by the judging unit.

BRIEF DESCRIPTION OF THE DRAWING

FIG. 5 is a schematic diagram showing the new-type recordable blank disc 141 in the part (a) thereof, and showing the track format of the new-type recordable blank disc 141 in the part (b) thereof.

DESCRIPTION OF CHARACTERS

Figure 1:
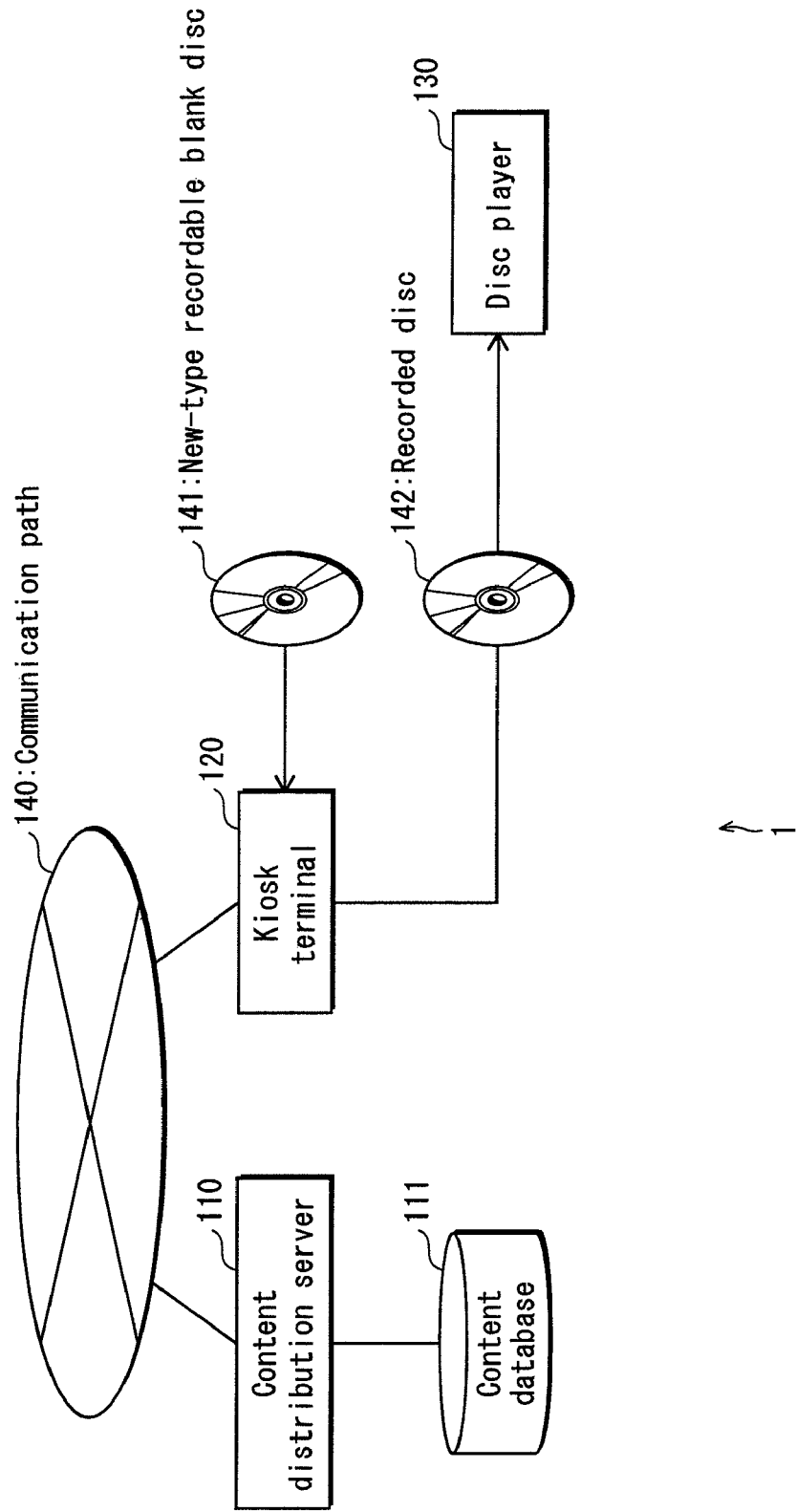
FIG. 1 shows the overall structure of a content distribution system 1.

1 content distribution system
110 content distribution server
111 content database
120 kiosk terminal
130 disc player
140 communication path
141 new-type recordable blank disc
142 recorded disc
201 lead-in area
202 data area
203 lead-out area
301 polycarbonate resin layer
302 recording layer
303 reflection layer
304 protective layer
305 bonding layer
306 dummy substrate
311 groove
311b groove
312 land
312b land
313a address pit
313 Land Pre-Pit
313b Land Pre-Pit
1201 disc identifying unit
1202 logical characteristic obtaining unit
1203 physical characteristic obtaining unit
1204 data reading unit
1205 data writing unit
1206 charging unit
1207 certificate holding unit
1208 data writing control unit
1209 data obtaining unit
1210 communication unit
1211 operation unit
1212 display unit

DETAILED DESCRIPTION OF THE INVENTION

The following describes the best mode for carrying out the present invention, with reference to the attached drawings.

<Overall Structure of Content Distribution System 1>

FIG. 1 shows the overall structure of a content distribution system 1 in Embodiment 1 of the present invention.

As shown in FIG. 1, the content distribution system 1 includes a content distribution server 110, a content database 111, a kiosk terminal 120, a disc player 130, a communication path 140, a new-type recordable blank disc 141, and a recorded disc 142.

The content distribution server 110 is presumed to be a computer which is composed of a CPU, work memory, HDD and the like, but is not limited thereto. The content distribution server 110 is connected with the content database 111.

The content database 111 manages encrypted content data and CSS data associated therewith, where the encrypted content data is protected by CSS (Content Scrambling System).

More specifically, the content database 111 stores the following types of information by associating them with each other: (i) the encrypted content data generated by encrypting the AV data constituting the content using the title key; (ii) encrypted title key generated by encrypting the title key using the disc key; and (iii) a set of encrypted disc keys generated by encrypting the disc key using a plurality of master keys including a master key held by the disc player 130, respectively.

The content distribution server 110, in response to a request sent from the kiosk terminal 120 which will be described later, obtains an encrypted content of the requested content and the CSS data associated therewith from the content database 111. The content distribution server 110 transmits the obtained encrypted content and CSS data to the kiosk terminal 120.

The disc player 130 is an existing DVD playback device having a function to play back the DVD-ROM. Since it has the function to play back the DVD-ROM, the disc player 130 can play back the data conforming to the DVD-Video data and is protected by the CSS. In the present embodiment, the disc player 130 is presumed to be an existing commercial player, a software player using a personal computer or the like, but is not limited thereto.

The communication path 140 connecting between the content distribution server 110 and the kiosk terminal 120 is presumed to be the Internet, but is not limited thereto.

The new-type recordable blank disc 141 is a disc having characteristics of DVD-R and DVD-ROM, where DVD-R is a recordable disc and DVD-ROM is a read-only disc.

More specifically, the new-type recordable blank disc 141 has a physical characteristic: "there is no wobble", which is different from the physical characteristic of DVD-R, and has the same logical characteristic as DVD-ROM: "the R/RW physical format information is embedded with value 0".

The characteristics required for the new-type recordable blank disc 141 are not limited to those above, but may be any of physical characteristics, logical characteristics, and physical/logical characteristics in so far as the new-type recordable blank disc 141, when it is loaded into the kiosk terminal 120, can be recognized as another recordable blank disc than a DVD-R disc.

Also, the characteristics required for the new-type recordable blank disc 141 are not limited to those above, but may be any characteristics in so far as the new-type recordable blank disc 141, when it is loaded into the disc player 130 as the recorded disc 142 after data is recorded thereonto, can be recognized as a DVD-ROM disc.

As understood from the above description, although a physical characteristic of the new-type recordable blank disc 141 is presumed to be having no "wobble", which is a physical characteristic unique to DVD-R, this is merely one example. There are other physical characteristics that the new-type recordable blank disc 141 may have, such as: "the track format is not land & groove"; "there is no R-Information area"; and "the frequency of wobble is different from that defined in the DVD-R standard". The new-type recordable blank disc 141 may have any of such physical characteristics in so far as the new-type recordable blank disc 141 is recognized as not having the physical characteristics of DVD-R and recognized as different from a DVD-R disc when data is being recorded thereon. Also, the new-type recordable blank disc 141 may have the physical characteristics of DVD-ROM. One example of physical characteristics of DVD-ROM is that "there is no wobble".

Further, in the present example, the new-type recordable blank disc 141 is presumed to have the logical characteristic: "the R/RW physical format information is embedded with value 0". However, this is merely an example, as well. There are other logical characteristics that the new-type recordable blank disc 141 may have, such as: "the content provider information is recorded in the lead-in area"; and "a value indicating 'ROM disc' is preliminarily recorded as physical information". The new-type recordable blank disc 141 may have any of such logical characteristics in so far as the new-type recordable blank disc 141 is recognized as different from a DVD-R disc, and the disc can be recognized as a DVD-ROM disc by an existing DVD player when data is being recorded thereon.

With such a structure, data is written onto the new-type recordable blank disc 141 while the disc is recognized as a recordable disc that is different from a DVD-R disc. Further, the recorded disc 142 with data having been written thereon is recognized as a DVD-ROM disc when it is played back by an existing DVD player.

The disc player 130 does not play back a disc loaded therein when it judges that the disc is a DVD-R medium recording thereon a CSS content. This is because a mechanism for achieving conformation to the CSS rules has been incorporated into the disc player 130. However, the recorded disc 142, which is generated by recording a content onto the new-type recordable blank disc 141 having the above-described structure, does not have the characteristics of DVD-R, but has the characteristics of DVD-ROM, and thus can be played back by the disc player 130.

This completes explanation of the overall structure of the content distribution system 1.

<Outline of Services Provided by Content Distribution System 1>

Next will be described an outline of the services provided by the content distribution system 1.

The user selects a content to purchase from a list of contents displayed on the kiosk terminal 120, and inserts a blank disc into the kiosk terminal 120.

The new-type recordable blank disc 141 of the present invention resembles a conventional DVD-R in shape so that it can be played back by an existing DVD player. There is a possibility, therefore, that the user may insert a conventional DVD-R into the kiosk terminal 120 by mistake.

In this case, a CSS-protected content is written onto the DVD-R disc that was inserted by mistake by the user. As stated above, the disc player 130 does not play back a disc loaded therein when it judges that a CSS-protected content is recorded on the disc, since the disc player 130 has been incorporated with the mechanism for achieving conformation to the CSS rules. This is a disadvantage to the user since the user obtains only a disc that cannot be played back by the disc player 130 although the user has paid for the content.

In view of the above-described problem, it is preferable that the kiosk terminal 120 charges the user for a content only when the kiosk terminal 120 recognizes that the inserted blank disc is the new-type recordable blank disc 141 that is not DVD-R, and has characteristics that it can be recognized as a DVD-ROM disc and played back by an existing DVD player.

Also, there is a possibility that the user may insert a playback-only DVD-ROM, not the new-type recordable blank disc 141, by mistake. In this case, the kiosk terminal 120 cannot write a content onto the disc, which may make the user confused. Accordingly, it is preferable that the kiosk terminal 120 detects an erroneous insertion of a DVD-ROM disc before charging the user.

A specific method for distinguishing between the new-type recordable blank disc and other media such as DVD-R disc and DVD-ROM disc will be described later. Other than DVD-R and DVD-ROM, there are discs, such as DVD-RAM and DVD-RW, that might be inserted into the kiosk terminal 120 by mistake. An erroneous insertion of any of such discs should be detected as well. However, description of the detection method is omitted since it is similar to that for detecting an erroneous insertion of DVD-R or DVD-ROM.

After the user pays for a selected content, the kiosk terminal 120 obtains the selected content from the content distribution server 110. It is presumed here that the content obtained by the kiosk terminal 120 is data that conforms to the DVD-Video standard and is protected by CSS.

Next, the kiosk terminal 120 generates the recorded disc 142 by writing the obtained content onto the new-type recordable blank disc 141. The kiosk terminal 120 ejects the recorded disc 142, and the user obtains the ejected recorded disc 142.

The disc player 130 recognizes the recorded disc 142 inserted therein as a DVD-ROM disc, and plays back the content recorded thereon. The user watches/listens to the content played back by the disc player 130.

As described above, the content distribution system 1 of the present embodiment supports the new-type recordable blank disc 141 that has characteristics that are different from those of DVD-R and are those of DVD-ROM, and provides users with contents that can be played back by existing DVD players, by writing, onto the new-type recordable blank disc 141, data conforming to the DVD-Video standard and protected by CSS.

Also, in the content distribution system 1, when a disc is loaded into the kiosk terminal 120, the kiosk terminal 120 judges whether the loaded disc is the new-type recordable blank disc 141 or an existing recordable disc such as DVD-R. The kiosk terminal 120 writes, onto the disc, data conforming to the DVD-Video standard and protected by CSS, only when the loaded disc is judged to be the new-type recordable blank disc 141.

The above-described structure realizes a content distribution service which uses a recordable disc, with preventing a disc that cannot be played back by an existing DVD player from being generated, and preventing users from being confused.

This completes an outline of the services provided by the content distribution system 1.

<Structure of Kiosk Terminal 120>

Figure 2:
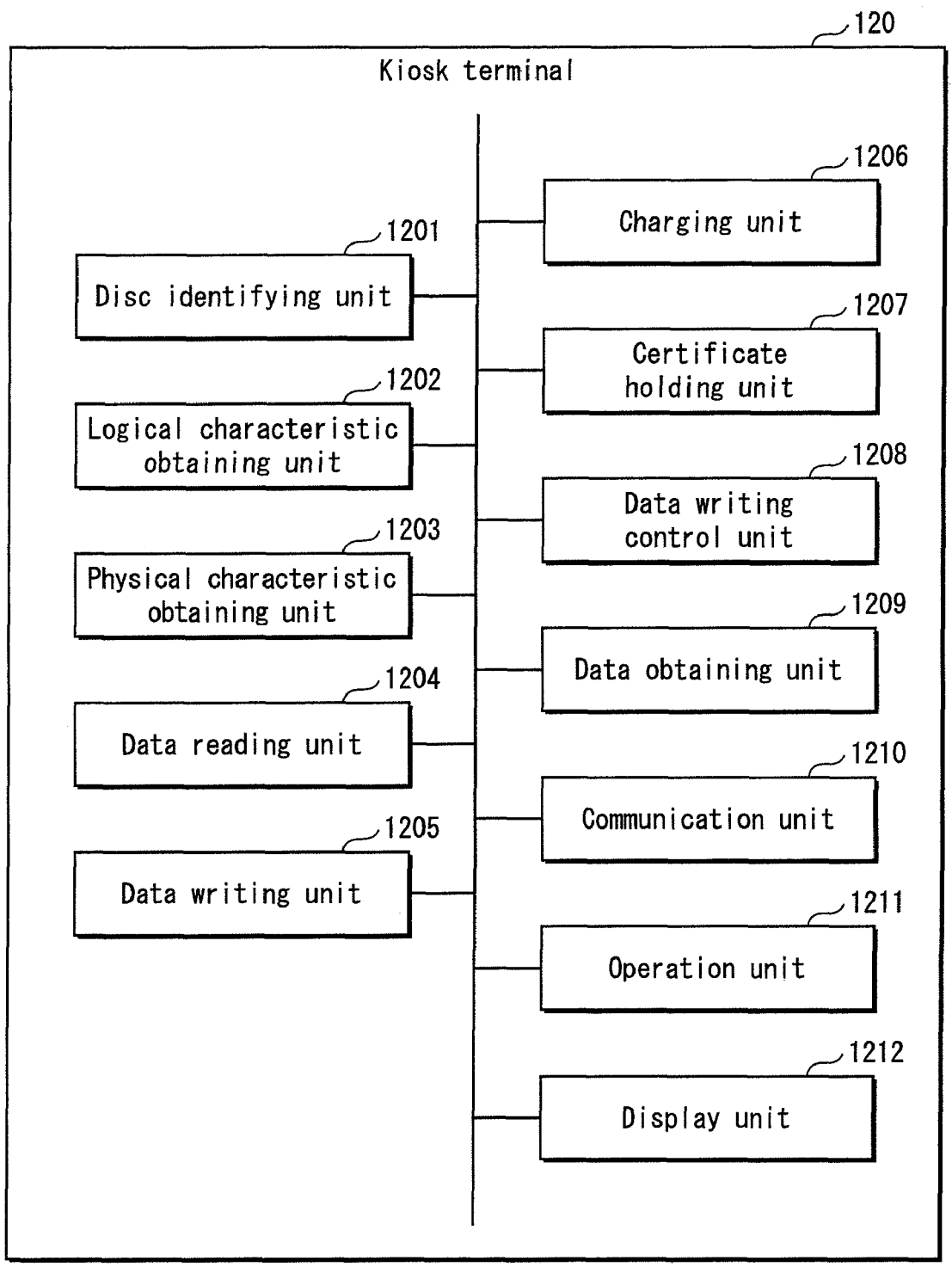
FIG. 2 is a functional block diagram functionally showing the structure of the kiosk terminal 120.

FIG. 2 is a functional block diagram functionally showing the internal structure of the kiosk terminal 120.

The kiosk terminal 120 includes a disc identifying unit 1201, a logical characteristic obtaining unit 1202, a physical characteristic obtaining unit 1203, a data reading unit 1204, a data writing unit 1205, a charging unit 1206, a certificate holding unit 1207, a data writing control unit 1208, a data obtaining unit 1209, a communication unit 1210, an operation unit 1211, and a display unit 1212.

The operation unit 1211 and the display unit 1212 respectively receive user operations, and then present contents of operations or contents of processes to the user. In the present embodiment, the operation unit 1211 and the display unit 1212 are presumed to be a touch panel. However, the operation unit 1211 and the display unit 1212 are not limited to a touch panel, but may be any other means insofar as the above-described processes can be performed.

The physical characteristic obtaining unit 1203 obtains physical characteristics from the disc. The data reading unit 1204 reads data from the disc. The data writing unit 1205 writes data onto the disc. In the present embodiment, the physical characteristic obtaining unit 1203, the data reading unit 1204 and the data writing unit 1205 are presumed to be a disc drive. However, the physical characteristic obtaining unit 1203, the data reading unit 1204 and the data writing unit 1205 are not limited to a disc drive, but may be any other means in so far as the above-described processes can be performed.

The communication unit 1210 performs a communication with the content distribution server 110 via the communication path 140. In the present embodiment, the communication unit 1210 is presumed to be an Ethernet™ terminal. However, the communication unit 1210 is not limited to an Ethernet™ terminal, but may be any other means in so far as the above-described communication can be performed with the content distribution server 110.

The certificate holding unit 1207 holds a certificate of the kiosk terminal 120. The certificate certifies to the content distribution server 110 that the kiosk terminal 120 is an authentically licensed terminal. More specifically, the certificate is a public key certificate obtained from a certification authority. In the present embodiment, the certificate holding unit 1207 is presumed to be a nonvolatile memory. However, the certificate holding unit 1207 is not limited to a nonvolatile memory, but may be any other means in so far as it can hold the certificate.

The disc identifying unit 1201, the logical characteristic obtaining unit 1202, the charging unit 1206, the data writing control unit 1208 and the data obtaining unit 1209 are presumed to software that operate using the CPU and the work memory in the kiosk terminal 120. However, instead of achieving these constituent elements by software, these constituent elements may be achieved by hardware.

This completes the explanation of the internal structure of the kiosk terminal 120.

<Operation of Kiosk Terminal 120>

Next, the operation of the kiosk terminal 120 will be described with reference to the flowcharts shown in FIGS. 3 and 4.

First, the display unit 1212 of the kiosk terminal 120 displays a list of contents provided by the present service. The user selects a content to purchase, by operating the operation unit 1211 (step S1).

Next, the kiosk terminal 120 requests the user to insert a blank disc for the content to be written thereto.

After the user inserts a disc, the disc identifying unit 1201 identifies a type of the inserted disc (step S2). The disc identification process will be described later in detail.

When the inserted disc is identified as the new-type recordable blank disc 141 (YES in step S3), the control goes to step S4.

When the inserted disc is not the new-type recordable blank disc 141 (NO in step S3), the kiosk terminal 120 does not write any data onto the disc, and jumps to step S7. In step S7, the kiosk terminal 120 ejects the disc (step S7), and ends the process.

As described above, before writing data onto the disc, the kiosk terminal 120 identifies a type of the inserted disc. The kiosk terminal 120 then writes data conforming to the DVD-Video standard and protected by CSS, only when the inserted disc is identified as the new-type recordable blank disc 141.

With this structure, the content distribution system 1 realizes a content distribution service which uses a recorable disc, with preventing a disc that cannot be played back by an existing DVD player from being generated, and preventing users from being confused.

In step S4 after step S3, the kiosk terminal 120 performs the charging process in which the kiosk terminal 120 charges an amount to the user via the display unit 1212, and receives the amount from the user (step S4).

After the kiosk terminal 120 completes the charging process, the data obtaining unit 1209 requests data associated with the content requested from the user in step S1, to the content distribution server 110 via the operation unit 1211 and the communication path 140.

In this step, the kiosk terminal 120 also transmits a public key certificate of the terminal itself, which is held by the certificate holding unit 1207, to the content distribution server 110. The kiosk terminal 120 is then subjected to the public key authentication process performed by the content distribution server 110. The kiosk terminal 120 can receive the data associated with the requested content only when the content distribution server 110 judges that the public key certificate is authentic; and cannot receive the data associated with the requested content when the content distribution server 110 judges that the public key certificate is not authentic.

In the present embodiment, the content distribution server 110 performs a one-way authentication. However, the content distribution server 110 and the kiosk terminal 120 may perform a mutual authentication therebetween.

As described above, with the structure where the content distribution server 110 authenticates the kiosk terminal 120, the content distribution system 1 can prevent a party from spoofing the kiosk terminal 120 and obtaining a content in an unauthorized manner.

After the content distribution server 110 successfully authenticates the public key certificate, the data obtaining unit 1209 obtains the content data that has already been made conforming to the DVD-Video standard and protected by CSS by the server (step S5).

When it obtains the content data, the data obtaining unit 1209 also obtains, from the content distribution server 110, an encrypted title key and a set of encrypted disc keys that are managed by the content database 111 in association with the encrypted content data. The data obtaining unit 1209 further obtains the content provider information from the content distribution server 110.

Next, the data writing unit 1205 writes the data obtained by the data obtaining unit 1209 onto the new-type recordable blank disc 141 (step S6).

More specifically, the data writing unit 1205 writes the encrypted title key into the sector header area, writes the set of encrypted disc keys and the content provider information into the lead-in area, and writes the encrypted content data into the data area. Note that the data writing unit 1205 writes these types of data into the respective areas, under control of the data writing control unit 1208.

After the data writing unit 1205 completes writing all data, the data writing control unit 1208 confirms that the data writing onto the disc has ended normally.

After this, the kiosk terminal 120 ejects the disc (step S7), and ends the process.

This completes explanation of the process performed by the kiosk terminal 120.

<Detailed Flow of Disc Identification Process>

Figure 3:
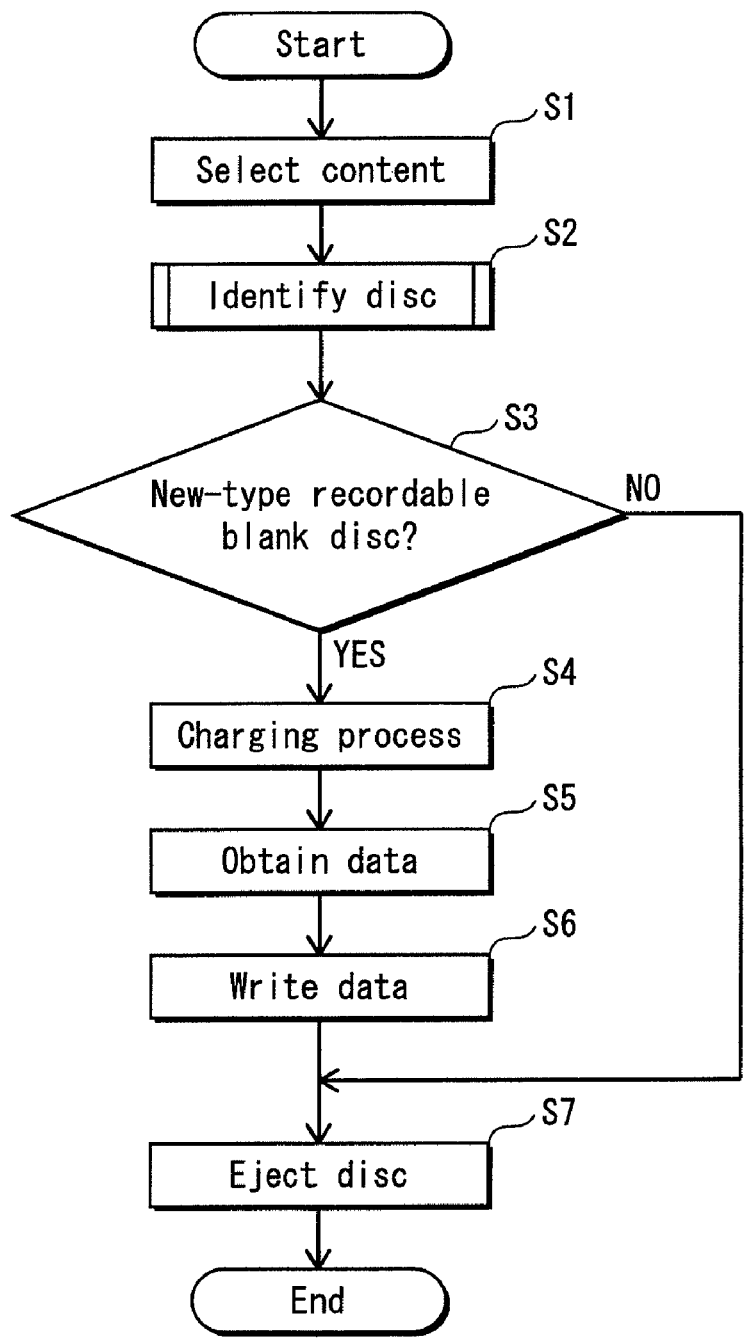
FIG. 3 is a flowchart of the content selling process performed by the kiosk terminal 120.
Figure 4:
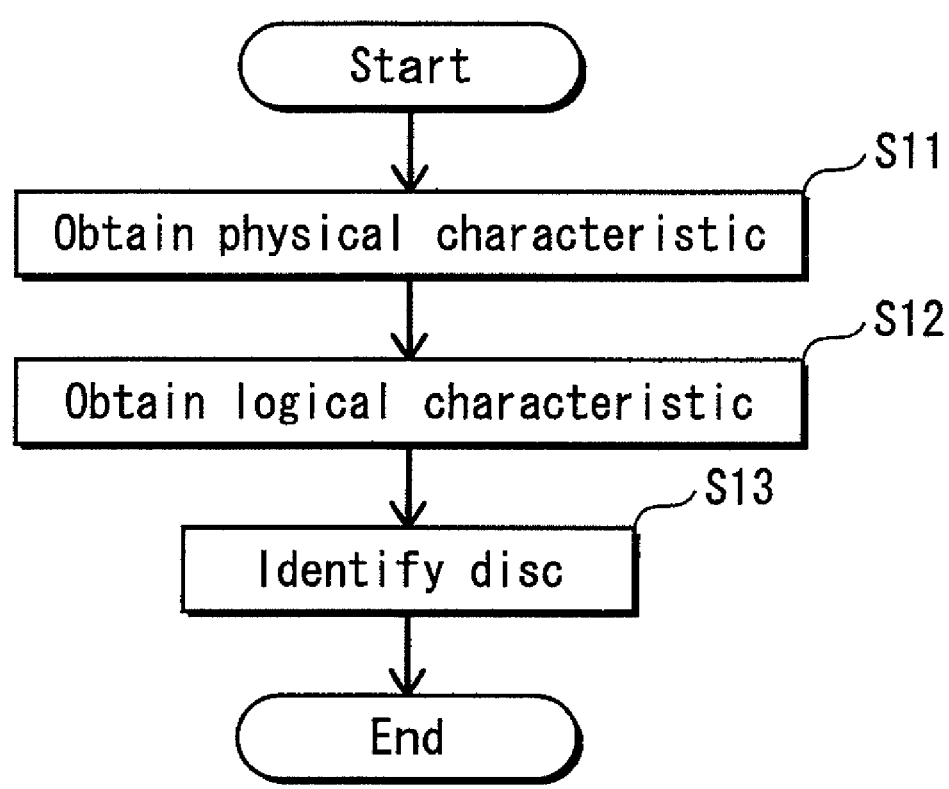
FIG. 4 is a flowchart of the disc identification process performed by the kiosk terminal 120.

FIG. 4 is a flowchart of the disc identification process performed by the kiosk terminal 120. The operation explained here is a detail of step S2 shown in FIG. 3.

The physical characteristic obtaining unit 1203 obtains the physical characteristic of the disc loaded into the kiosk terminal 120 (step S11). The physical characteristic obtained here is indication of whether or not there is a wobble.

Next, the logical characteristic obtaining unit 1202 obtains the logical characteristic of the disc loaded into the kiosk terminal 120, via the data reading unit 1204 (step S12). The logical characteristic obtained here is "data of an area in which the R/RW physical format information is recorded".

Following this, the disc identifying unit 1201 identifies a type of the loaded disc based on the characteristics obtained in steps S11 and S12 (step S13).

More specifically, the disc identifying unit 1201 judges that the loaded disc is the new-type recordable blank disc 141 only when the loaded disc has physical characteristic "there is no wobble", and has logical characteristic "the R/RW physical format information is entirely embedded with value 0".

As mentioned earlier, although the physical characteristic of the new-type recordable blank disc 141 is presumed to be having no "wobble", which is a physical characteristic unique to DVD-R, this is merely one example. There are other physical characteristics that the new-type recordable blank disc 141 may have, such as: "the track format is not land & groove"; "there is no R-Information area"; and "the frequency of wobble is different from that defined in the DVD-R standard". The new-type recordable blank disc 141 may have any of such physical characteristics in so far as the new-type recordable blank disc 141 is recognized as not having the physical characteristics of DVD-R and recognized as different from a DVD-R disc when data is being recorded thereon. In such cases, the disc identifying unit 1201 may identify the loaded disc by using these physical characteristics, respectively.

Also, the disc identifying unit 1201 may judge whether or not the loaded disc is the new-type recordable blank disc 141 by confirming the presence of a plurality of physical characteristics, or by confirming the presence of one physical characteristic.

Further, although the new-type recordable blank disc 141 is presumed to have the logical characteristic: "the R/RW physical format information is entirely embedded with value 0", this is merely an example, as well. There are other logical characteristics that the new-type recordable blank disc 141 may have, such as: "the content provider information is recorded in the lead-in area"; and "a value indicating 'ROM disc' is preliminarily recorded as physical information". The new-type recordable blank disc 141 may have any of such logical characteristics in so far as the new-type recordable blank disc 141 is recognized as different from a DVD-R disc when data is being recorded thereon, and the disc can be recognized as a DVD-ROM disc by an existing DVD player. In such cases, the disc identifying unit 1201 may identify the loaded disc by using these logical characteristics, respectively. Also, the disc identifying unit 1201 may judge whether or not the loaded disc is the new-type recordable blank disc 141 by confirming the presence of a plurality of logical characteristics, or by confirming the presence of one logical characteristic.

Further, the disc identifying unit 1201 may judge whether or not the loaded disc is the new-type recordable blank disc 141 by confirming the presence of either the physical characteristics or the logical characteristics, not by confirming the presence of both the physical characteristics and the logical characteristics.

Also, a judgment on whether the loaded disc is a DVD-ROM disc or the new-type recordable blank disc 141 can be made by judging whether the disc stores data concerning the file system of the disc.

When it is judged that the disc stores data concerning the file system of the disc, the loaded disc is judged to be a DVD-ROM disc. In the present embodiment, it is judged whether the disc stores data concerning the file system of the disc to judge whether the loaded disc is a DVD-ROM disc or the new-type recordable blank disc 141. This is because a DVD-ROM disc and the new-type recordable blank disc 141 resemble each other in the physical characteristics. The method for the distinction is not limited to this. For example, a physical characteristic or a logical characteristic that has been used to distinguish between a DVD-R disc and a DVD-ROM disc conventionally may be attached to the new-type recordable blank disc, and a judgment on whether the loaded disc is a DVD-ROM disc or the new-type recordable blank disc 141 can be made by judging whether the loaded disc has the characteristic in question (it is preferable that, to avoid a confusion among identification processes, the characteristic to be attached to the new-type recordable blank disc 141 is different from the characteristic that is used to distinguish between a DVD-R disc and the new-type recordable blank disc 141). That is to say, the method for distinguishing between a DVD-ROM disc and the new-type recordable blank disc 141 is not limited to the above-described one, but may be any method that uses one or more differences between the two types of discs in the physical and/or logical characteristics.

This completes the explanation of the disc identification process.

Next, the new-type recordable blank disc 141 will be described.

<Physical Characteristics of New-Type Recordable Blank Disc 141>

Here will be described the structure of the new-type recordable blank disc 141.

The basic specifications of the new-type recordable blank disc 141 are as follows.

Measurement: 120 mm of diameter and 0.6 mm of thickness in each of two substrates bonded together
Data capacity: 4.70 gigabytes/surface
Laser wavelength: 650 nm
Track pitch: 0.74 μm
Reflection ratio: 45-85%
Objective lens NA: 0.60
Modulation method: 8/16 modulation As shown in part (a) of FIG. 5, recording areas are formed spirally in order from the inner circumference to the outer circumference of the disc, the recording areas being composed of a lead-in area 201, a lead-out area 203, and a data area 202 that are formed on the inner circumference side, on the outer circumference side, and in the middle of them, respectively.

The lead-in area 201 stores information necessary for controlling the drive unit of the disc player 130.

The information, used as the control data, is described in a range from the $17.5^{th}$ track to approximately the $105^{th}$ track, within a radius of 24 mm from the center of the disc, where the data area 202 starts from the radius of 24 mm towards the outer circumference. The first one sector of the control data is the physical format information that indicates the physical characteristics of the disc.

The data area 202 stores the content data written by the kiosk terminal 120.

The lead-out area 203 is an area that is merely used to indicate the end of the data area 202, and no data is recorded therein.

The area composed of the lead-in area 201, the data area 202, and the lead-out area 203 is referred to as an information area.

Note that in conventional DVD-R discs, a storage area called "R-Information area" is provided at a location more inner than the information area towards the center of the disc. On the other hand, the new-type recordable blank disc 141 is provided with an area 204 that corresponds to the conventional R-Information area, but no recording film is formed in the area 204.

The part (b) of FIG. 5 illustrates the track format of the new-type recordable blank disc 141.

As shown in the part (b) of FIG. 5, grooves 311 and lands (between grooves) 312, as the tracks in the format, are formed spirally on the substrates of the new-type recordable blank disc 141. The track pitch is 0.74 μm.

The grooves 311 are used to guide the laser beam, and data is recorded thereinto, as well. A plurality of Land Pre-Pits 313 are formed cyclically on the lands 312. The Land Pre-Pits 313 are separate bits that are disposed on the lands 312 at a predetermined cycle. The Land Pre-Pits 313 are used in the positioning during data recording, and provides information necessary for recording, such as recording addresses.

The amplitude of the groove wobble in the grooves 311 of the new-type recordable blank disc 141 is 0. This is a unique characteristic of the new-type recordable blank disc 141, not owned by the conventional discs conforming to the DVD-R standard.

In this way, the new-type recordable blank disc 141 has a physical characteristic that is different from that of the conventional DVD-R discs. This structure enables that, when the kiosk terminal 120 is instructed to write data into a recording medium loaded thereinto, the kiosk terminal 120 obtains, from the loaded recording medium, information that indicates the track format of the recording medium as the physical characteristic thereof, and based on the obtained information, the kiosk terminal 120 judges whether the loaded recording medium is a conventional DVD-R disc or the new-type recordable blank disc 141.

As shown also in the part (b) of FIG. 5, the new-type recordable blank disc 141 is formed by bonding two substrates together with a bonding layer 305 therebetween, wherein one of the substrates is composed of a polycarbonate resin layer 301, a recording layer 302, a reflection layer 303, and a protective layer 304, and the other is a dummy substrate 306 having the same structure. Note that the part (a) of FIG. 5 shows only part of the dummy substrate.

Figure 6:
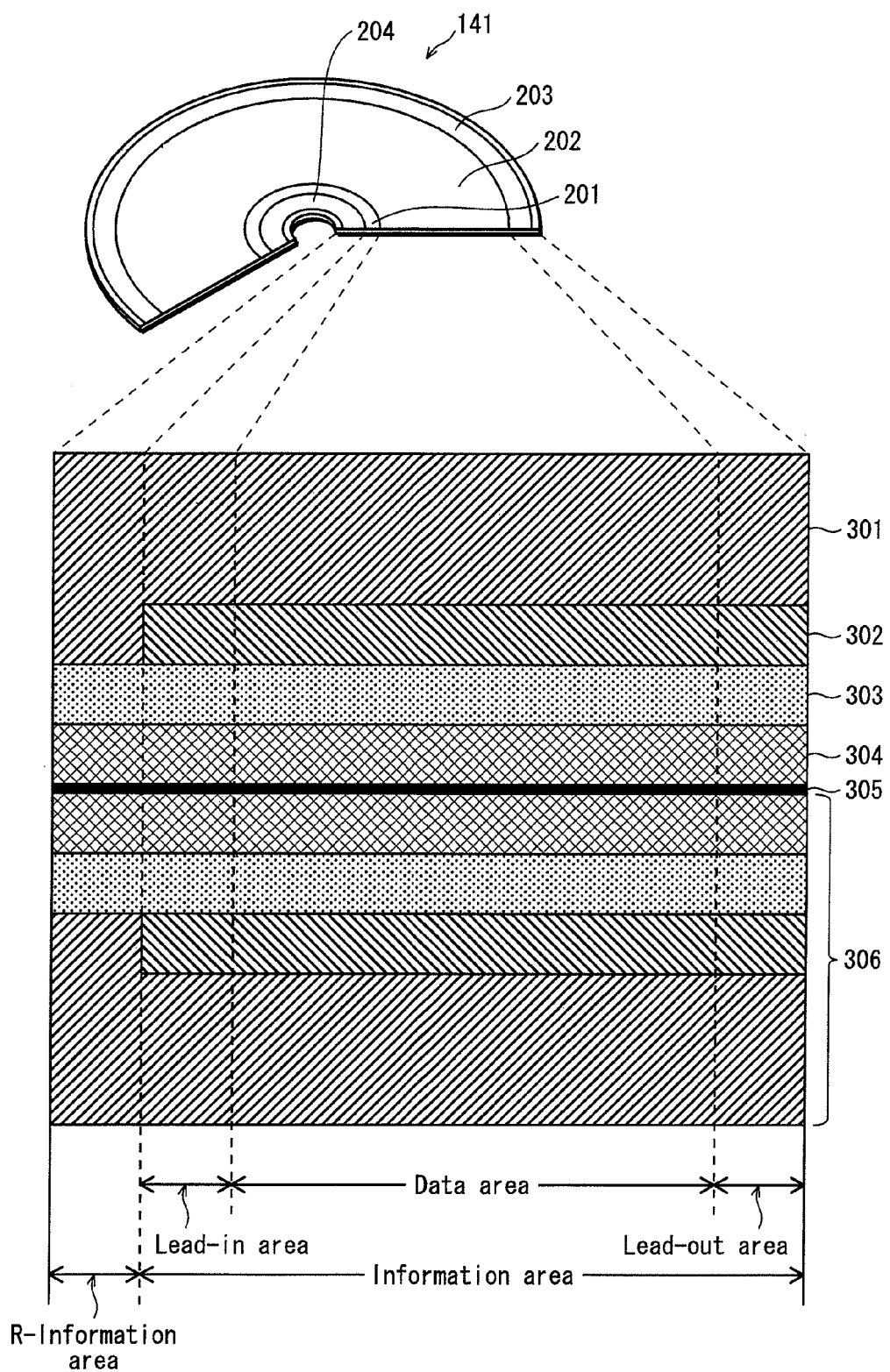
FIG. 6 is a schematic diagram showing the physical structure of the new-type recordable blank disc 141.

FIG. 6 is a cross-sectional view of the new-type recordable blank disc 141. The polycarbonate resin layer 301, recording layer 302, reflection layer 303, protective layer 304, bonding layer 305, and dummy substrate 306 will be described with reference to FIG. 6.

The polycarbonate resin layer 301 is formed by projecting a polycarbonate resin to a stamper, which is a mold for manufacturing the substrates. The method of producing the stamper will be described later.

The recording layer 302 is in close contact with the polycarbonate resin layer 301 and the reflection layer 303. The recording layer 302 is formed by applying a material of a recording film to the polycarbonate resin layer 301. Used as the material of the recording film in the new-type recordable blank disc 141 is an organic dye having a low decomposition temperature, such as a cyanine-based dye or a phthalocyanine-based dye.

Data is recorded by changing the chemical state of the organic dye by a laser beam. More specifically, the heat provided by the laser beam melts the recording layer 302 and a layer (the polycarbonate resin layer 301) adjacent to the recording layer 302. This causes the organic dye and the polycarbonate resin to be mixed, which changes the optical characteristics such as the reflection ratio, phase characteristics and the like. This enables recording marks to be formed.

It should be noted here that the new-type recordable blank disc 141 is characterized in that the recording film of the organic dye is not formed in the area 204 that is located more inner than the information area towards the disc center, and corresponds to the R-Information area provided in the conventional DVD-R and DVD-RW discs.

The reflection layer 303 is formed to be in close contact with the recording layer 302. The reflection layer 303 is made of aluminum so as to increase the reflection ratio of the recording layer 302. When the disc player 130 performs data reading, the reflection layer 303 reflects the light that has passed the recording layer 302 to enhance the efficiency of the disc player 130 in reading the recorded signal.

The protective layer 304 is an ultraviolet curable resin provided to protect the recorded data from a flaw, distortion and the like of the disc.

The bonding layer 305 is used to bond together the substrate composed of the polycarbonate resin layer 301, recording layer 302, reflection layer 303, and protective layer 304 and the dummy substrate 306. The bonding is performed by, for example, the hot melt bonding. The dummy substrate 306 is provided for the purpose of preventing the disc from warping, and thus has the same structure as the other substrate.

<Logical Characteristics of New-Type Recordable Blank Disc 141>

Figure 7:
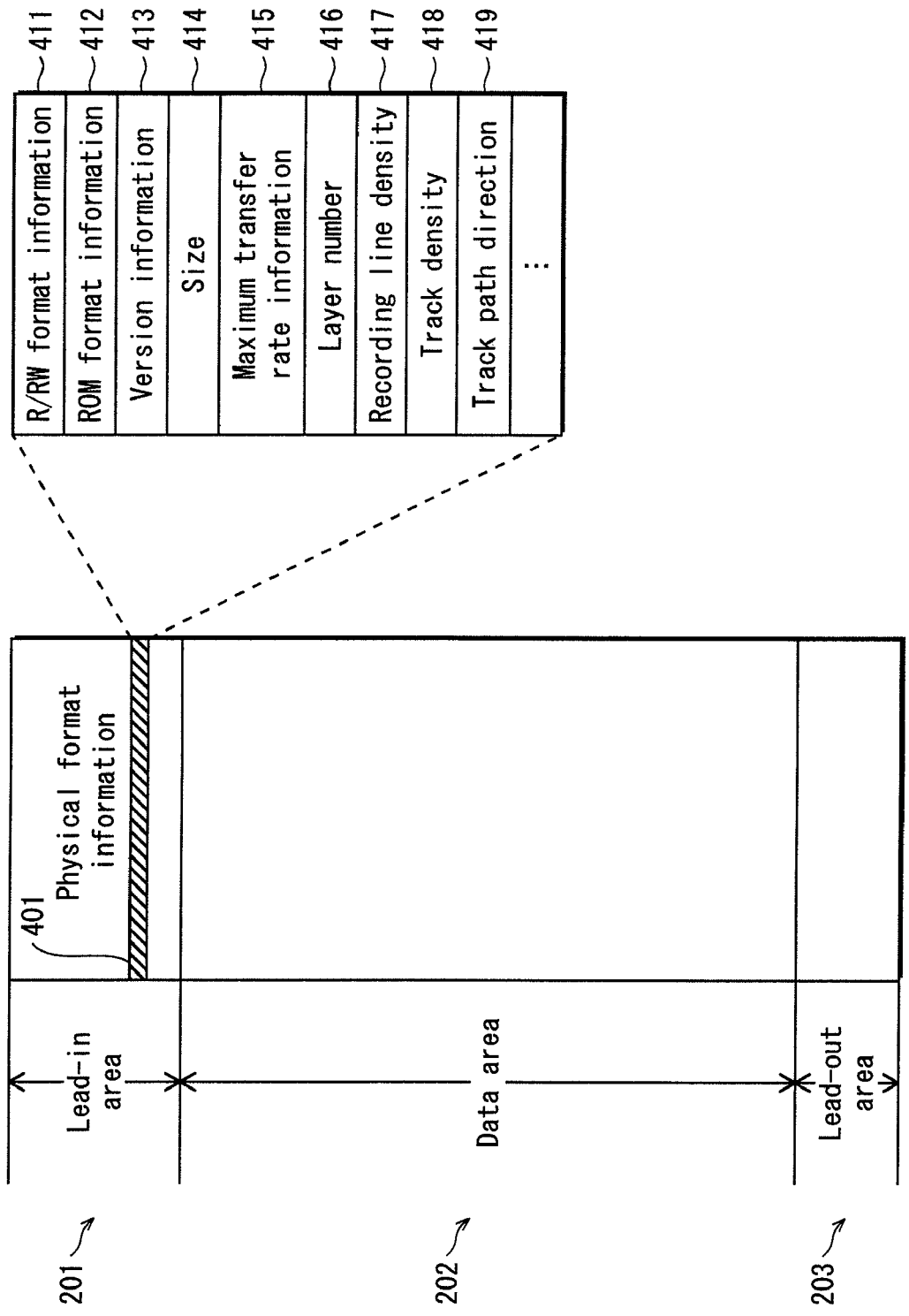
FIG. 7 shows the logical data of the new-type recordable blank disc 141.

FIG. 7 shows the logical data of the new-type recordable blank disc 141 before content data is recorded thereonto.

The control data is recorded in the lead-in area 201. The control data includes physical format information 401. The physical format information 401 includes R/RW format information 411, ROM format information 412, version information 413, size 414, maximum transfer rate information 415, layer number 416, recording line density 417, track density 418, and track path direction 419.

As the physical format information of the new-type recordable blank disc 141, the physical format information 401 may include other information than the above-mentioned one.

This physical format information of the new-type recordable blank disc 141 is characterized in that:

(a) the R/RW physical format information 411 is entirely embedded with value 0; and (b) the ROM format information 412 has a value indicating that the disc is a ROM disc.

In conventional DVD-R discs, a bit sequence indicating that the disc is a DVD-R disc is recorded in the area of the R/RW physical format information 411.

In contrast, in the new-type recordable blank disc 141, the area of the R/RW physical format information 411 is entirely embedded with value 0. With this structure, when the new-type recordable blank disc 141 is loaded into the kiosk terminal 120 for data recording, the kiosk terminal 120 can judge that the loaded disc is a disc that is different from a conventional DVD-R disc. Note that the measure for allowing the disc to be distinguished from a conventional DVD-R disc is not limited to the above-described one where the area of the R/RW physical format information 411 is entirely embedded with value 0. For example, the area storing the R/RW physical format information 411 may be entirely embedded with a same value like 1, or may be embedded with an arbitrary value that is different from the bit sequence indicating that the disc is a DVD-R disc.

Also, in conventional DVD-R discs, the physical format information 401 does not have a value indicating that the disc is a ROM disc.

In contrast, the new-type recordable blank disc 141 of the present application has the physical format information 401 indicating that the own disc is a ROM disc, although the disc is actually a recordable-type disc.

The disc player 130 determines the type of a disc by reading the physical format information from the disc. Thus, the new-type recordable blank disc 141 is treated as a DVD-ROM by the disc player 130 when the content is played back by the disc player 130.

Accordingly, even if a CSS-protected content has been recorded on the new-type recordable blank disc 141 loaded thereinto, the disc player 130 can play back the content of the loaded disc.

The data area 202 stores the content data written by the kiosk terminal 120.

The data area 202 is divided into sectors. Each sector includes a header area storing a sector number identifying the sector, a data area storing the data, and an ECC (Error Correction Code) area storing an error correction code used to correct an error in data reading.

As in conventional DVD media, UDF (Universal Disc Format) is used as the file system of the data area 202 of the new-type recordable blank disc 141.

After the content data is recorded onto the new-type recordable blank disc 141, the disc is referred to as the recorded disc 142. The recorded disc 142 will be described later.

<Manufacturing Method of New-Type Recordable Blank Disc 141>

Figure 8:
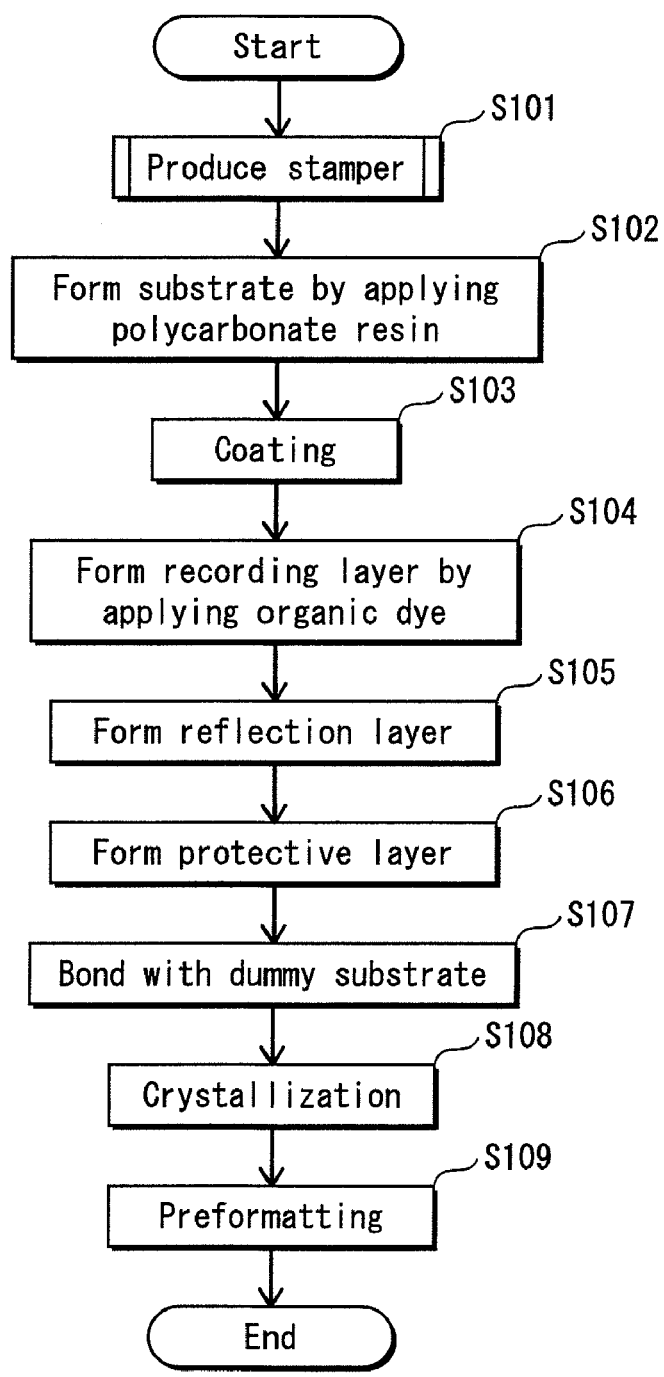
FIG. 8 is a flowchart showing a manufacturing method of the new-type recordable blank disc 141.

FIG. 8 is a flowchart showing a manufacturing method of the new-type recordable blank disc 141.

First, the stamper is produced (step S101).

In step S2 and onwards, the stamper produced in step S1 is used to produce a plurality of new-type recordable blank discs 141.

First, a polycarbonate substrate is formed by projecting a polycarbonate resin to the stamper produced in step S1 (step S102).

Next, an ultraviolet curable resin is applied to a flat surface of the polycarbonate substrate, and then ultraviolet ray is radiated to the applied ultraviolet curable resin to form a layer thereof (step S103).

Next, the recording layer is formed by applying an organic dye by the spin coat method onto a substrate surface opposite to the surface onto which the ultraviolet curable resin has been applied, namely onto a substrate surface in which the grooves 311, the lands 312 and the Land Pre-Pits 313 have been formed (step S104).

It should be noted here that, in the process of forming the recording layer in step S104, as mentioned earlier, the organic dye is applied only to the information area, but is not applied to areas located more inner than the information area towards the disc center. With this procedure, it is possible to manufacture the new-type recordable blank disc 141 that does not have the R-Information area being a storage area provided in DVD-R discs.

Following this, the reflection layer is formed on the recording layer by the sputtering method (step S105).

Next, the protective layer is formed by overcoating with the ultraviolet curable resin (step S106).

After this, the substrate having been processed so far is bonded with the dummy substrate to prevent the disc, which is completed with this bonding, from warping (step S107).

The completed disc is heated to the crystallization temperature so that the crystallization occurs and the recording layer is initialized (step S108).

Finally, the disc is preformatted (step S109). This completes the new-type recordable blank disc 141. The preformatting is a process for writing, onto each of the completed discs, information including identification information and key information that are unique to the disc.

When there is no need to write information unique to the disc, the preformatting process in step S109 may be omitted.

<Producing Stamper>

Figure 9:
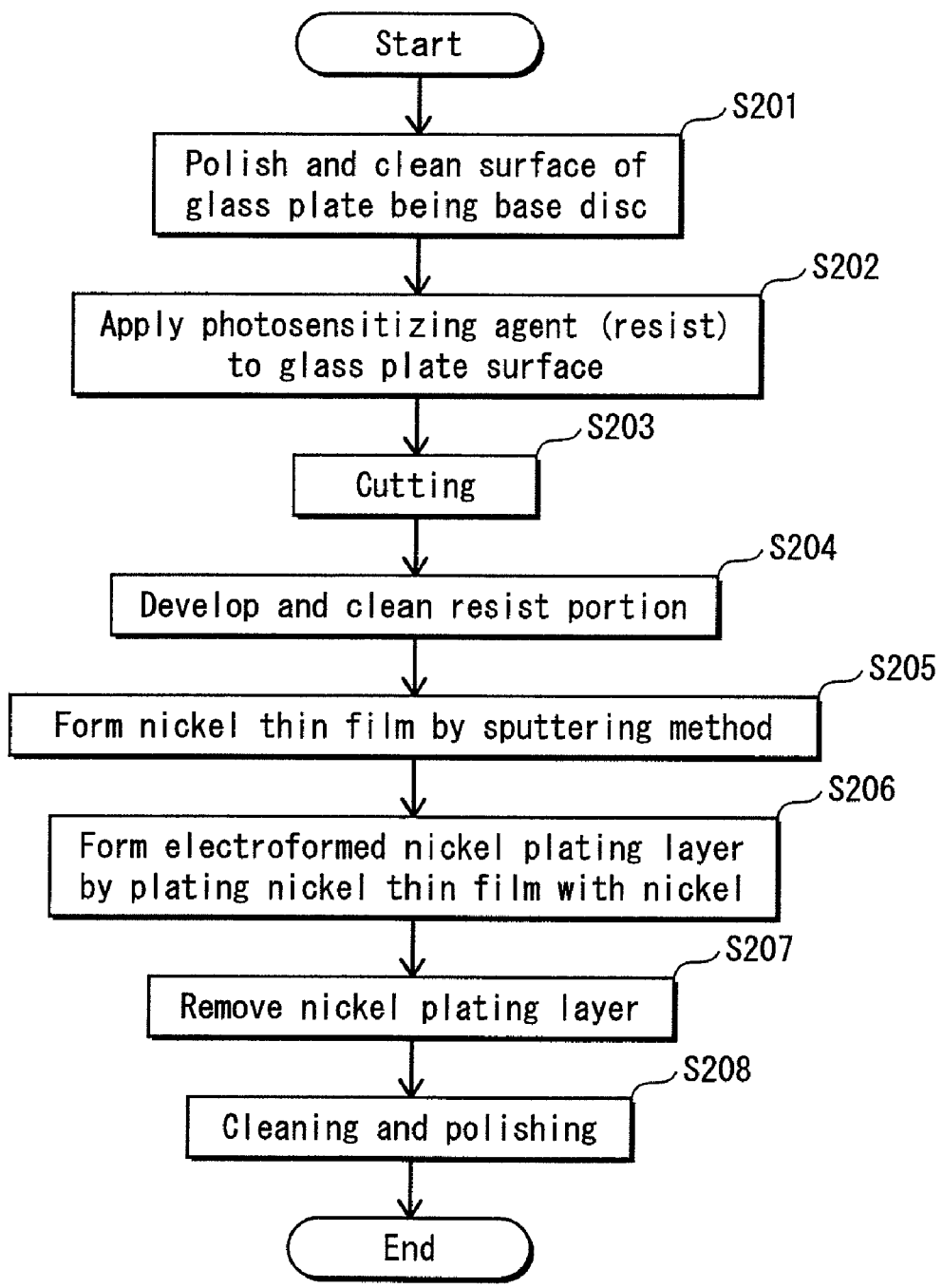
FIG. 9 is a flowchart showing the production procedure of the stamper for the new-type recordable blank disc 141.

FIG. 9 is a flowchart showing the procedure for producing the stamper. The process described here is a detail of step S101 shown in FIG. 8.

First, a surface of a glass plate as a base disc is polished and cleaned (step S201).

Next, a photosensitizing agent (resist) is applied to the glass plate surface (step S202).

After this, the surface with the resist applied thereto is exposed to a laser beam so that the tracks and pits are formed therein, and the cutting is performed (step S203).

In step S203, the cutting is performed so that the grooves 311, the lands 312, and the Land Pre-Pits 313 shown in the part (b) of FIG. 5 are formed. Further, in step S203, the cutting is performed so that the area of the R/RW physical format information is entirely embedded with value 0.

After this, the resist portion is developed and cleaned (step S204), forming convexes and concaves with the remainder of the resist on the surface. This completes a prototype disc with these convexes and concaves having been formed on its surface as the tracks and pits.

Next, a thin film of nickel is formed onto the surfaces of the tracks and pits of the prototype disc by the sputtering method (step S205).

After this, the surface of the nickel thin film is plated with nickel to form an electroformed nickel plating layer (step S206).

Lastly, the nickel plating layer is removed from the prototype disc (step S207), and is cleaned and polished (step S208). This completes the stamper made of nickel.

<Logical Characteristics of Recorded Disc 142>

Figure 10:
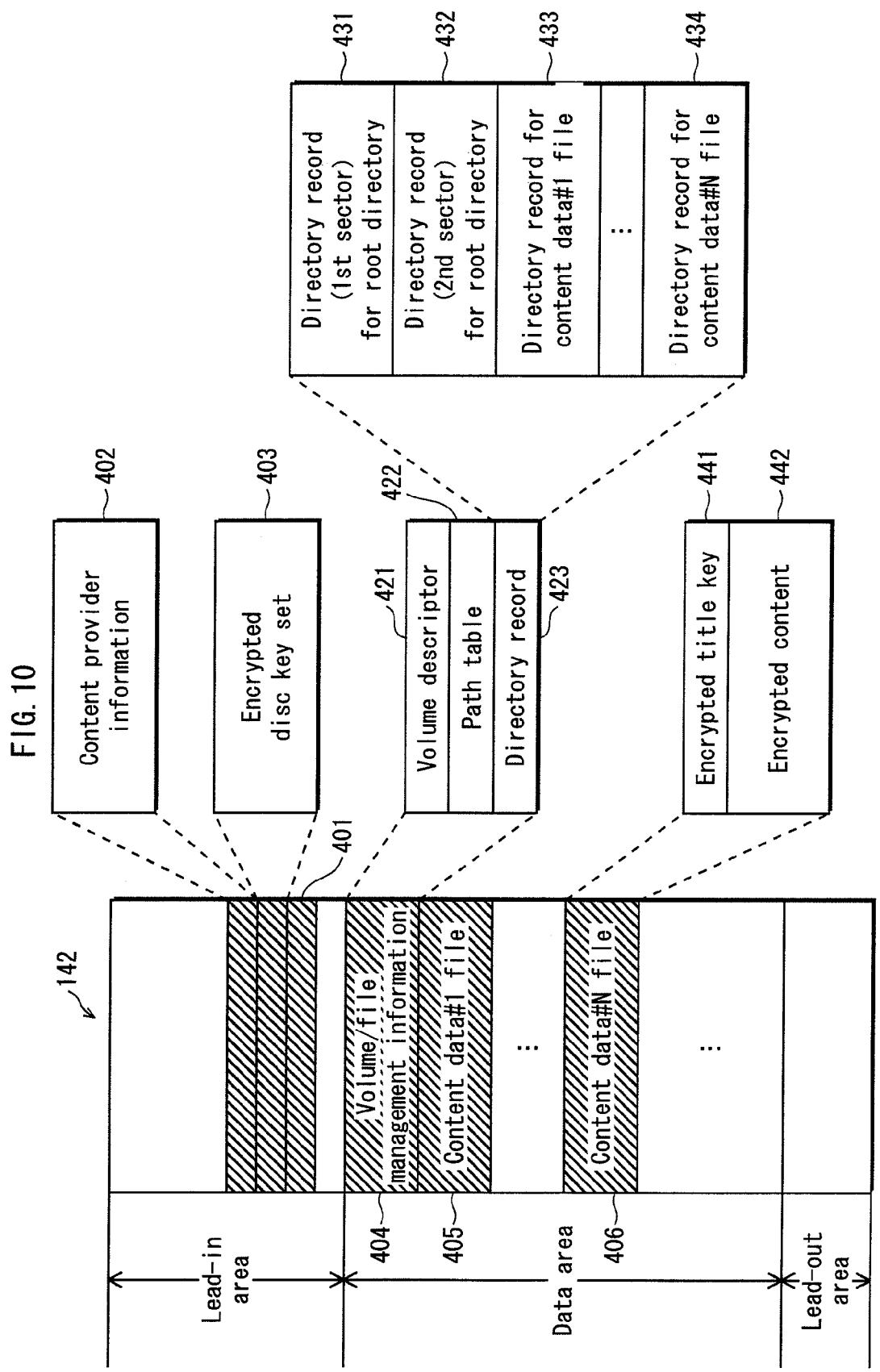
FIG. 10 shows the logical data of the recorded disc 142.

FIG. 10 shows the logical data of the recorded disc 142 after content data is recorded by the kiosk terminal 120 onto the new-type recordable blank disc 141.

As shown in FIG. 10, content provider information 402 and an encrypted disc key set 403 have been recorded, in addition to the physical format information 401, in the lead-in area of the recorded disc 142.

The content provider information 402 and the encrypted disc key set 403 are written by the kiosk terminal 120 when the kiosk terminal 120 writes the content data onto the new-type recordable blank disc 141.

With regards to conventional DVD-ROM discs, the content provider information is recorded into the lead-in area when the disc is manufactured. As for conventional DVD-R discs, the content provider information is not recorded into the lead-in area.

As described above, in the recorded disc 142 after the content data is recorded by the kiosk terminal 120 onto the new-type recordable blank disc 141, the content provider information has been recorded into the lead-in area, and the disc has the same logical characteristics as the ROM discs. This enables the disc player 130 to judge the recorded disc 142 as a DVD-ROM disc and play back the content data protected by CSS that is recorded on the recorded disc 142.

The UDF is used as the file system for the data area of the recorded disc 142 in which the content data is recorded and managed.

As shown in FIG. 10, recorded in the data area in the order are volume/file management information 404, content data#1 file 405, . . . , content data#N file 406, . . .

The volume/file management information 404 includes a volume descriptor 421, a path table 422, and a directory record 423.

Described in the volume descriptor 421 is information indicating the size of the volume space, the recording position of the path table 422, the recording position of the directory record 423 and the like.

The path table 422 associates recording positions with paths of all directories recorded on the recorded disc 142.

Described in the directory record 423 are directory or file identifiers, data recording position information, file size, file attribute and the like. More specifically, the directory record 423 is composed of a directory record (first sector) for root directory 431, a directory record (second sector) for root directory 432, a directory record for content data #1 file 433, . . . , a directory record for content data#N file 434.

The content data#N file 406 includes an encrypted title key 441 and an encrypted content 442.

As mentioned earlier, in the CSS, three types of 40-bit encryption keys (title key, disc key, and master key) are used hierarchically.

The title key is used for encrypting a content. The disc key is used for encrypting a title key. The master key is used for encrypting a disc key. Note that the master key is individually given to entities having a license to manufacture the CSS machine. In the present embodiment, the master key is implemented into the disc player 130 securely.

Accordingly, when the disc player 130 is to decrypt the encrypted content 442, the disc player 130 should first generate a disc key by decrypting an encrypted disc key using the securely held master key as the decryption key, and then generate a title key by decrypting an encrypted title key using the disc key as the decryption key. After this, the disc player 130 can generate a content by decrypting the encrypted content 442 using the title key as the decryption key.

<Examples of Modifications to New-Type Recordable Blank Disc 141>

Here, some examples of modifications to new-type recordable blank disc 141 will be described.

(a) First Modification Example

The basic specifications of the new-type recordable blank disc in the first modification example are the same as those of the new-type recordable blank disc 141.

The new-type recordable blank disc in the first modification example is composed of the polycarbonate resin layer 301, recording layer 302, reflection layer 303, protective layer 304, bonding layer 305, and dummy substrate 306, that are the same as those shown in FIG. 6, constituting the new-type recordable blank disc 141 in Embodiment 1.

Figure 11:
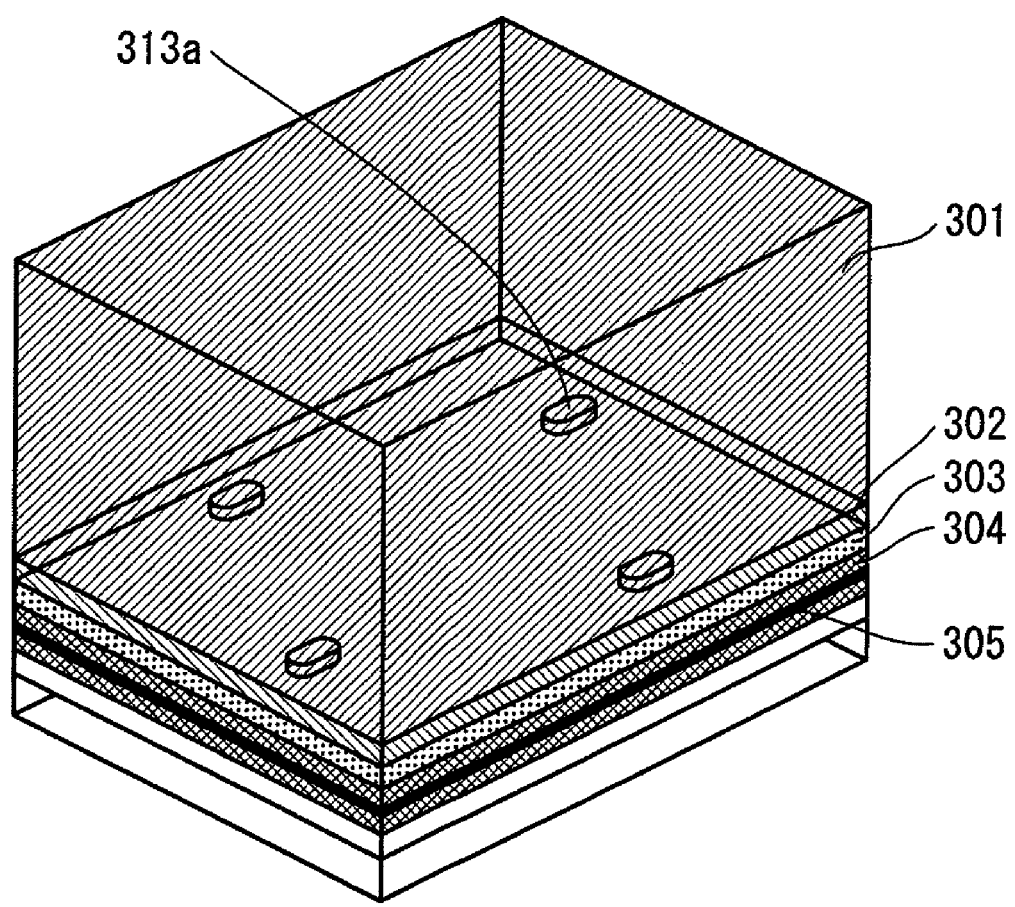
FIG. 11 illustrates the track format of the new-type recordable blank disc in the first modification example.

FIG. 11 illustrates the track format of the new-type recordable blank disc in the first modification example.

In the new-type recordable blank disc in the first modification example, a plurality of address pits 313a are formed on a flat surface of the disc, where no land or groove is formed on the surface.

Figure 12:
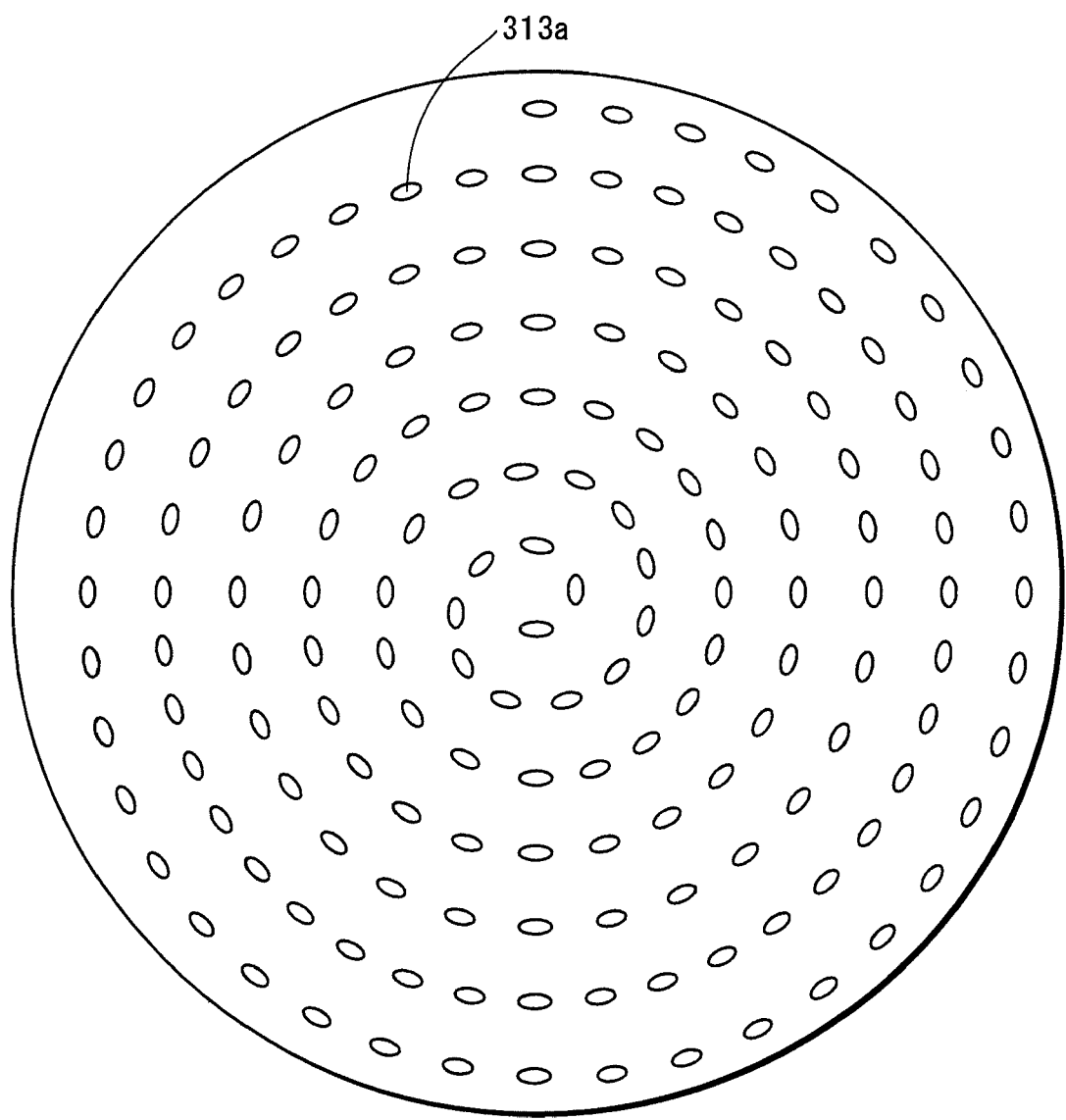
FIG. 12 illustrates the track format of the new-type recordable blank disc in the first modification example.

FIG. 12 shows an arrangement of the address pits 313a on the disc. As shown in FIG. 12, the address pits 313a are arranged at regular intervals so that tracks are formed spirally in order from the inner circumference to the outer circumference of the disc.

When the kiosk terminal 120 records data onto the disc, it determines the recording positions by using the address pits 313a arranged as described above.

The new-type recordable blank disc in the first modification example has the same physical and logical characteristics as the new-type recordable blank disc 141, except that "the track format is not land & groove".

The new-type recordable blank disc in the first modification example can be manufactured by almost the same method as the manufacturing method of the new-type recordable blank disc 141 shown in FIGS. 8 and 9, except that the cutting process in step S203 shown in FIG. 9 is different.

In step S203 of the stamper production process in manufacturing the new-type recordable blank disc in the first modification example, the cutting is performed so that a plurality of address pits are formed, and no land or groove is formed.

The new-type recordable blank disc in the first modification example is apparently different from the conventional DVD-R discs in the track format. This enables that, when the kiosk terminal 120 is instructed to write data into a recording medium loaded thereinto, the kiosk terminal 120 obtains, from the loaded recording medium, information that indicates the track format of the recording medium as the physical characteristic thereof, and based on the obtained information, the kiosk terminal 120 judges whether the loaded recording medium is a conventional DVD-R disc or the new-type recordable blank disc.

Also, the new-type recordable blank disc in the first modification example is treated as a DVD-ROM when the content is played back by the disc player 130 because the disc has the physical format information 401 shown in FIG. 7. Accordingly, even if a CSS-protected content has been recorded on the new-type recordable blank disc in the first modification example loaded thereinto, the disc player 130 can play back the content of the loaded disc.

(b) Second Modification Example

The basic specifications of the new-type recordable blank disc in the second modification example are the same as those of the new-type recordable blank disc 141.

Also, the new-type recordable blank disc in the second modification example is composed of the polycarbonate resin layer 301, recording layer 302, reflection layer 303, protective layer 304, bonding layer 305, and dummy substrate 306, that are the same as those shown in FIG. 6, constituting the new-type recordable blank disc 141 in Embodiment 1.

Figure 13:
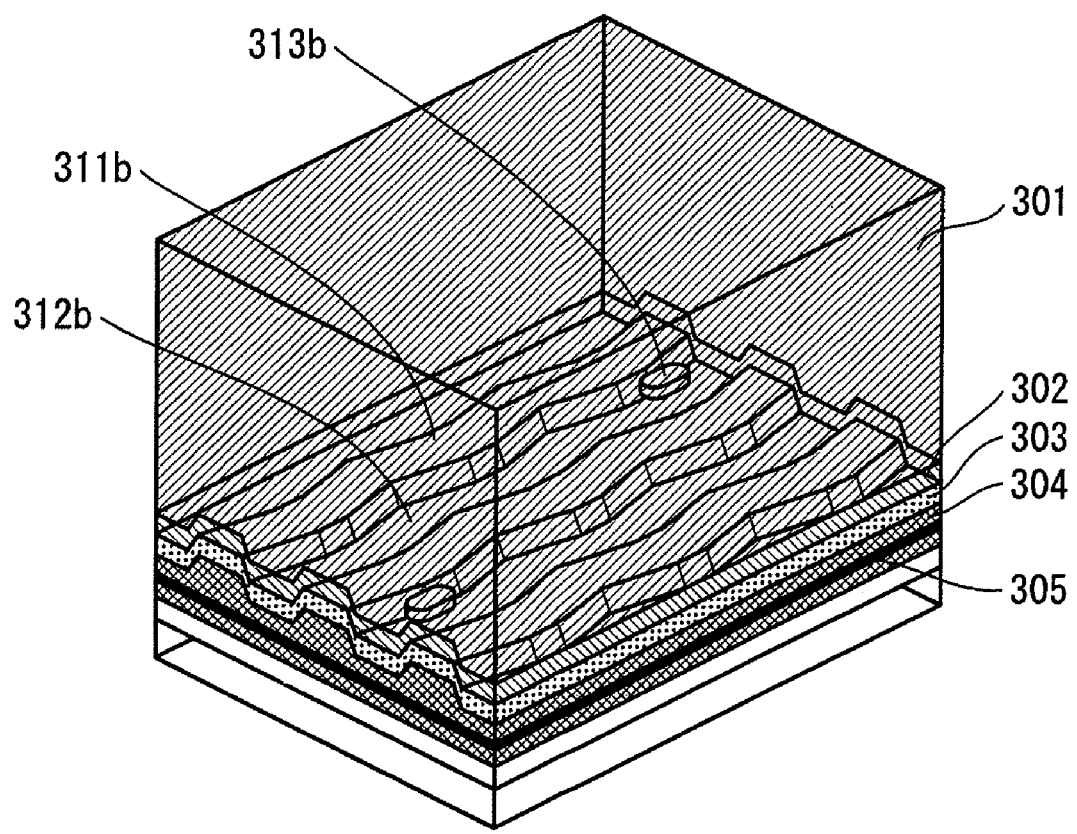
FIG. 13 illustrates the track format of the new-type recordable blank disc in the second modification example.

FIG. 13 illustrates the track format of the new-type recordable blank disc in the second modification example.

In the new-type recordable blank disc in the second modification example, grooves 311*b* and lands 312*b* are formed spirally, and on the lands 312*b*, a plurality of Land Pre-Pits 313*b* are formed cyclically. The track pitch is 0.74 μm.

As shown in FIG. 13, the grooves 311*b* are wobbling grooves.

Figure 14A:
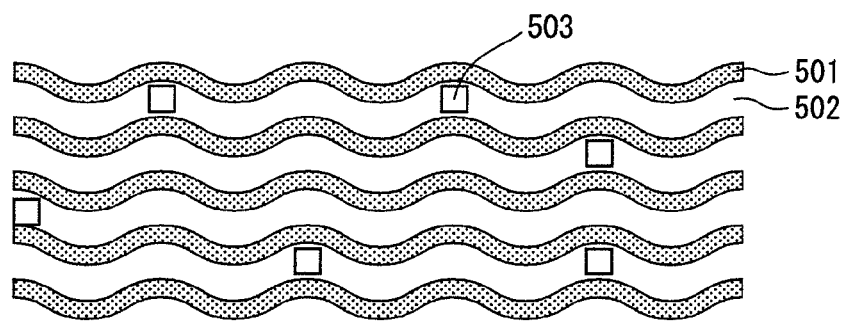
FIGS. 14A and 14B are provided to explain the groove wobble of the new-type recordable blank disc in the second modification example wobble.
Figure 14B:
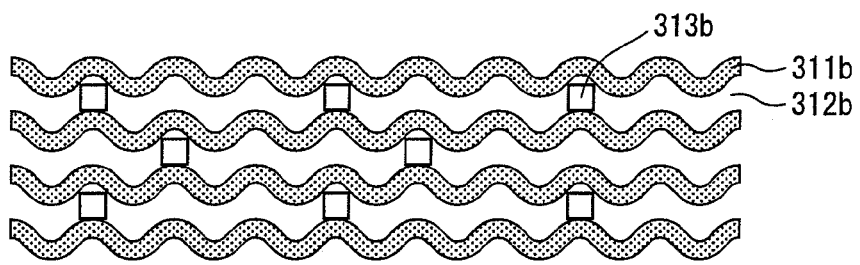

FIGS. 14A and 14B are provided to explain the groove wobble of the new-type recordable blank disc in the second modification example wobble.

As shown in FIG. 14A, the land & groove is used as the track format in a conventional DVD-R disc. Grooves 501 and lands 502 are formed on the disc, and on the lands, a plurality of Land Pre-Pits 503 are formed at a predetermined cycle.

The groove wobble of the conventional DVD-R disc has a frequency of 140.645 kHz, in conformance with the DVD-R standard.

On the other hand, as shown in FIG. 14B, the groove wobble of the new-type recordable blank disc in the second modification example has a frequency of 280 kHz.

The new-type recordable blank disc in the second modification example has the same physical and logical characteristics as the new-type recordable blank disc 141, except that the grooves are wobbling grooves.

The new-type recordable blank disc in the second modification example can be manufactured by almost the same method as the manufacturing method of the new-type recordable blank disc 141 shown in FIGS. 8 and 9, except that the cutting process in step S203 shown in FIG. 9 is different.

In step S203 of the stamper production process in manufacturing the new-type recordable blank disc in the second modification example, the cutting is performed so that grooves (whose wobble has a frequency of 280 kHz), lands, and a plurality of Land Pre-Pits are formed.

The new-type recordable blank disc in the second modification example is apparently different from the conventional DVD-R discs in the frequency of the groove wobble. This enables that, when the kiosk terminal 120 is instructed to write data into a recording medium loaded thereinto, the kiosk terminal 120 obtains, from the loaded recording medium, the frequency of the groove wobble as the physical characteristic thereof, and based on the obtained frequency, the kiosk terminal 120 judges whether the loaded recording medium is a conventional DVD-R disc or the new-type recordable blank disc.

Also, the new-type recordable blank disc in the second modification example is treated as a DVD-ROM when the content is played back by the disc player 130 because the disc has the physical format information 401 shown in FIG. 7. Accordingly, even if a CSS-protected content has been recorded on the new-type recordable blank disc in the second modification example loaded thereinto, the disc player 130 can play back the content of the loaded disc.

The frequency of groove wobble of the new-type recordable blank disc is specified as 280 kHz in the second modification. However, the frequency of 280 kHz is only one example, and the groove wobble of the new-type recordable blank disc may have other frequencies. For example, it may be a value, such as 70 kHz, resulted from a fractional multiplication or an integral multiplication of the frequency of the groove wobble of the conventional DVD-R disc (that is, 140.645 kHz). Further, the frequency of groove wobble of the new-type recordable blank disc is not limited to the value resulted from the fractional multiplication or integral multiplication of 140.645 kHz, but may be any value in so far as the kiosk terminal 120 can distinguish the groove wobble of the disc from that of DVD-R discs.

<Other Modification Examples>

Up to now, the present invention has been described through an embodiment thereof. However, the present invention is not limited to the embodiment, but includes, for example, the following modifications.

(1) In Embodiment 1, the content database 111 manages encrypted content data, encrypted title key, and a set of encrypted disc keys by associating them with each other. However, the present invention is not limited to this structure, but may have another structure in so far as these three types of data are preliminarily prepared so that these data can be written to the new-type recordable blank disc by the kiosk terminal 120.

For example, the set of encrypted disc keys may be preliminarily recorded into the lead-in area of the new-type recordable blank disc 141. In this case, the kiosk terminal 120 reads out an encrypted disc key from the inserted disc, and transmits the read-out encrypted disc key to the content distribution server 110 in step S5 (FIG. 3). Upon receiving the encrypted disc key from the kiosk terminal 120, the content distribution server 110 generates a disc key by decrypting the encrypted disc key using a master key that is held by the content distribution server 110. The content distribution server 110 then generates an encrypted title key by encrypting a title key that has been used to the AV data of the requested content. The content distribution server 110 then transmits the generated encrypted title key and the encrypted content data to the kiosk terminal 120. Note that, in this procedure, the kiosk terminal 120, instead of the content distribution server 110, may encrypt the title key.

Also, the content database 111 may handle only plaintext AV data, and the kiosk terminal 120 may encrypt the content data, generate the title key, and encrypt the title key. Further, the fact that the encrypted disc key is recorded in the lead-in area may be used as a logical characteristic of the disc so that the inserted disc is identified in step S2. As another modification, the kiosk terminal 120 may hold the master key, obtain a title key by decrypting an encrypted title key using the master key, and transmit the obtained title key to the content distribution server 110 over a safe communication path.

(2) In Embodiment 1, the authentication process is performed between the kiosk terminal 120 and the content distribution server 110 in step S5. Not limited to this, any other process may be performed in so far as the content data can be recorded onto an authentic disc.

For example, a disc certificate may be preliminarily recorded onto the new-type recordable blank disc 141, and the content distribution server 110 may authenticate the new-type recordable blank disc 141.

Also, in this case, in step S2, the kiosk terminal 120 may identify the disc using a logical characteristic: "a disc certificate is recorded on the disc".

Further, the disc certificate may be protected based on an identifier, such as a media ID, that identifies the new-type recordable blank disc 141. In this case, the certificate may be encrypted based on the identifier, or an authenticator of the disc certificate may be generated based on the identifier, and the generated authenticator may be recorded. Other than these, any known, widely used protection technology may be used.

Further, the disc certificate itself (entry of certificate) may have been written with an identifier or data based on an identifier such that certificates and discs are associated with each other on a one-to-one basis.

Further, part of the identifier may be associated with an ID that identifies the disc manufacturing maker. In this case, using this association, a certificate may be associated with each manufacturing lot or each disc manufacturing maker, not with each disc on a one-to-one basis.

With any of these structures where certificates and discs are associated with each other, it is possible to prevent an unauthorized act such as an unauthorized copy of a certificate for unauthorized use of data.

Further, not limited to a certificate, but any other means may be used in so far as it has the same effect as the certificate and its authenticity can be verified.

(3) In Embodiment 1, the new-type recordable blank disc 141 is presumed to be compatible with a DVD disc. However, the new-type recordable blank disc of the present invention may be another type of recordable disc such as a Blu-ray disc.

Even in this case, the new-type recordable blank disc 141 may have physical characteristics or logical characteristics or both the physical and logical characteristics such that it is recognized as the new-type recordable blank disc when data is to be written thereonto, and the disc with data recorded thereon can be played back by a player having been shipped.

(4) In Embodiment 1, the new-type recordable blank disc 141 is a recordable disc. However, not limited to this, the disc of the present invention may be a rewritable disc in so far as the disc with data recorded thereon can be recognized as a disc that can be played back by a player having been shipped.

(5) In Embodiment 1, the disc is identified by using physical characteristics or logical characteristics or both the physical and logical characteristics. However, the present invention is not limited to this structure.

For example, part or all of a program necessary for playback of a content may be preliminarily recorded on the disc so that it is possible to identify the disc by checking whether the part or all of the program has been recorded thereon. Alternatively, the disc may be identified by checking whether or not the part or all of the program recorded thereon is authentic.

Also, the disc may be identified by running the part or all of the program recorded thereon. Further, the disc may be identified by verifying a signature attached to the part or all of the program recorded thereon.

Still further, the part or all of the program may be protected based on an identifier (for example, a media ID) for identifying the new-type recordable blank disc. For example, the part or all of the program may be encrypted based on the identifier. Also, an authenticator may be generated based on the identifier, and the generated authenticator may be recorded. Other than these, any widely used protection technologies may be used.

Further, an identifier or data based on the identifier may be written into the part or all of the program such that the disc is associated with the part or all of the program on a one-to-one basis.

Further, when part of the identifier written in the part or all of the program matches an identifier of the disc manufacturing maker, the part or all of the program may be associated with each manufacturing lot or each disc manufacturing maker, not with each disc on a one-to-one basis.

By associating a disc with the part or all of the program written thereon by any of the above-described structures, it is possible to prevent the part or all of the program from being copied for use in an unauthorized manner.

(6) In Embodiment 1, the kiosk terminal 120 obtains content data from the content distribution server 110 via the communication path 140. However, not limited to this, the kiosk terminal 120 may rely on any other means in so far as it can obtain data that is to be written onto the new-type recordable blank disc 141. For example, the kiosk terminal 120 may obtain content data using a recording medium such as HDD.

(7) In Embodiment 1, the CSS is used as the technology for protecting the copyright of the content recorded on the disc. However, not limited to this, any other technologies, such as AACS (Advanced Access Content System), may be used to protect the copyright of the content.

In this case, key data (for example, MKB) related to AACS may be preliminarily recorded on the new-type recordable blank disc 141, and the kiosk terminal 120 may identify the disc by checking whether or not the MKB is recorded thereon. Alternatively, the kiosk terminal 120 may identify the disc by an identifier included in the MKB.

The CSS used in Embodiment 1 has three layers: (i) encrypting a disc key using a master key; (ii) encrypted a title key using the disc key; and (iii) encrypting a content using the title key. However, the present invention is not limited to this structure.

The present invention may have four or more layers by adding one or more keys other than the above-described ones, or may have two layers or one layer where the disc key is directly used to encrypt the content.

(8) In Embodiment 1, the kiosk terminal 120 writes content data onto the disc based on a direct input by a user into the kiosk terminal 120. However, this structure is not indispensable for the present invention.

Any terminal device may be used instead of the kiosk terminal 120 that is operated by a user him/herself. For example, it may be such a terminal device that is operated by a shop attendant or the like based on a request from a user.

(9) A commercial machine such as a DVD recorder may be used as the terminal device of the present invention for writing content data onto the disc, instead of the kiosk terminal 120 that is installed in the shop.

In this case, the terminal device may be provided with, instead of the charging unit 1206, a payment processing unit for processing a payment by a credit card or the like via the Internet or the like.

Also, in this case, the terminal device may be provided with, instead of the display unit 1212, an image outputting unit for outputting an image to an external image display device such as a television. Also, in this case, a remote controller is used as the operation unit 1211.

The terminal device displays information on the image display device such as a television connected with the image outputting unit, and the user operates the remote control watching the information displayed on the image display device.

In this case, the terminal device operates in the same manner as the kiosk terminal shown in FIGS. 3 and 4, except that the charging process performed in step S4 is replaced with the payment process performed by the payment processing unit in which a payment by a credit card or the like is processed via the Internet or the like.

This structure enables a user to purchase a new DVD title without going to a shop. Note that the payment processing unit needs not be a constituent element of the terminal device, but may be an independent device that is attached to the terminal device.

(10) A conventional commercial machine such as a DVD recorder may be used as the disc player 130. This is because, as described earlier, such a conventional commercial machine can recognize the recorded disc 142, which is generated by recording data onto the new-type recordable blank disc 141, as a DVD-ROM disc.

Here, the disc player 130 may be provided with functional units that realize functions equivalent to those of the disc identifying unit 1201, logical characteristic obtaining unit 1202, and physical characteristic obtaining unit 1203 of the kiosk terminal 120 described in Embodiment 1, in addition to conventional functional units provided in the conventional commercial machine (a medium input/output unit, a decoding unit, a playback unit, a network connection unit, an operation input unit, an image outputting unit and the like).

More specifically, the physical characteristic obtaining unit of the disc player 130 may be realized by a disc drive, and the logical characteristic obtaining unit and the disc identifying unit may be software that operate using the CPU and the work memory.

After a disc is inserted into the own device, the disc player 130 identifies a type of the inserted disc by performing the same process as the disc identification process performed by the kiosk terminal 120 in step S2 shown in FIG. 3.

When the disc identification process results in a judgment that the inserted disc is the recorded disc 142, the disc player 130 handles the inserted disc as a DVD-ROM disc, and plays back the inserted disc in the same manner as a DVD-ROM disc.

(11) Each device described in Embodiment 1 is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and each device to achieve its functions.

The computer program mentioned above is composed of a plurality of instruction codes which each instructs the computer to achieve a predetermined function.

Note that each device described in Embodiment 1 may not necessarily be a computer system that includes all of the microprocessor, ROM, RAM, hard disk unit, display unit, keyboard, mouse and the like, but may be a computer system that includes part of these.

(12) Part or all of the structural elements constituting the devices described in the embodiment above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of structural elements constituting each of the above-described devices may be achieved on one chip, or part or all thereof may be achieved on one chip.

Although the term LSI is used here, it may be called IC, LSI, super LSI, ultra LSI or the like, depending on the level of integration. The method for achieving the integrated circuits is not limited to the LSI, but the integrated circuits may be achieved by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(13) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(14) The present invention may be methods shown by the above. The present invention may be a computer program that allows a computer to realize the methods, or may be a digital signal representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(15) The present invention may be any combination of the above-described embodiment and modifications.

The present invention can be used in industries for selling contents that are based on the conventional CSS technology, to users via kiosk terminals.

Also, the present invention can be used in industries for manufacturing and selling the new-type recordable blank disc of the present invention.

The invention claimed is:

1. A data recording device licensed to record content data onto a recording medium, comprising:
   a selecting unit operable to receive a selection of content data;
   an obtaining unit operable to obtain a groove wobble characteristic of a recording medium on which the selected content data is to be recorded;
   a judging unit operable to judge whether or not the obtained groove wobble characteristic of the recording medium is distinguishable from groove wobble characteristic defined in a DVD-R standard, and the recording medium is a recordable-type recording medium having compatibility with the DVD-ROM standard;
   a payment processing unit operable to perform a payment process for an amount to use the selected content data when the judging unit judges affirmatively; and
   a writing unit operable to not write the content data onto the recording medium when the judging unit judges negatively, and to write the content data onto the recording medium when the judging unit judges affirmatively and the payment process performed by the payment processing unit is completed.

2. The data recording device of claim 1, wherein
   the writing unit judges whether the content data is protected by CSS (Content Scrambling System) and the content data conforms to a DVD-Video standard, and writes the content data onto the recording medium when the writing unit judges that the content data is protected by CSS and conforms to the DVD-Video standard and the judging unit judges affirmatively and the payment process performed by the payment processing unit is completed.

3. The data recording device of claim 2, wherein
   the writing unit writes content provider information into a lead-in area of the recording medium when the judging unit judges affirmatively and the payment process performed by the payment processing unit is completed.

4. The data recording device of claim 1, wherein
   the obtaining unit obtains an amplitude of groove wobble as the groove wobble characteristic, and
   the judging unit judges that the groove wobble characteristic of the recording medium is distinguishable from groove wobble defined in the DVD-R standard when the obtained amplitude is "0".

5. The data recording device of claim 1, wherein
   the obtaining unit obtains a frequency of groove wobble as the groove wobble characteristic, and
   the judging unit judges that the groove wobble characteristic of the recording medium is distinguishable from groove wobble defined in the DVD-R standard when the obtained frequency is distinguishable from a groove wobble frequency defined in the DVD-R standard.

6. The data recording device of claim 5, wherein
   the judging unit judges that the groove wobble characteristic of the recording medium is distinguishable from groove wobble defined in the DVD-R standard when the obtained frequency is a value that is a result of an integral multiplication or a fractional multiplication of the groove wobble frequency defined in the DVD-R standard.

7. The data recording device of claim 1 further comprising:
   a medium holding unit operable to hold a recording medium that is an entity independent of the device and has been inserted into the device from outside; and
   a control unit operable to control the medium holding unit so as to eject the recording medium to outside the device when the judging unit judges negatively.

8. The data recording device of claim 1, wherein
   the writing unit writes the content data onto the recording medium using a predetermined groove wobble frequency having been set to the recordable-type recording medium that is distinguishable from a groove wobble frequency defined in the DVD-R standard.

9. The data recording device of claim 8, wherein
   the predetermined groove wobble frequency of the recordable-type recording medium has been set to a value that is a result of an integral multiplication or a fractional multiplication of the groove wobble frequency defined in the DVD-R standard.

10. A data recording method for use in a data recording device licensed to record content data onto a recording medium, the data recording method comprising:
    receiving a selection of content data;
    obtaining a groove wobble characteristic of a recording medium on which the selected content data is to be recorded;
    judging whether or not the obtained groove wobble characteristic of the recording medium is distinguishable from groove wobble characteristic defined in a DVD-R standard, and the recording medium is a recordable-type recording medium having compatibility with the DVD-ROM standard;
    performing a payment process for an amount to use the selected content data when the judging step judges affirmatively; and
    not writing the content data onto the recording medium when the judging step judges negatively, and writing the content data onto the recording medium when the judging step judges affirmatively and the payment process performed by the payment processing step is completed.

11. A non-transitory computer-readable recording medium storing a computer program for use in a data recording device, the computer program causing the data recording device to perform steps comprising:
    receiving a selection of content data;
    obtaining a groove wobble characteristic of a recording medium on which the selected content data is to be recorded;
    judging whether or not the obtained groove wobble characteristic of the recording medium is distinguishable from groove wobble characteristic defined in a DVD-R standard, and the recording medium is a recordable-type recording medium having compatibility with the DVD-ROM standard;
    performing a payment process for an amount to use the selected content data when the judging step judges affirmatively; and
    not writing the content data onto the recording medium when the judging step judges negatively, and writing the content data onto the recording medium when the judging step judges affirmatively and the payment process performed by the payment processing step is completed.

12. An integrated circuit licensed to record content data onto a recording medium, comprising:

a selecting unit operable to receive a selection of content data;

an obtaining unit operable to obtain a groove wobble characteristic of a recording medium on which the selected content data is to be recorded;

a judging unit operable to judge whether or not the obtained groove wobble characteristic of the recording medium is distinguishable from groove wobble characteristic defined in a DVD-R standard, and the recording medium is a recordable-type recording medium having compatibility with the DVD-ROM standard;

a payment processing unit operable to perform a payment process for an amount to use the selected content data when the judging unit judges affirmatively; and a writing unit operable to not write the content data onto the recording medium when the judging unit judges negatively, and to write the content data onto the recording medium when the judging unit judges affirmatively and the payment process performed by the payment processing unit is completed.

* * * * *